(12) United States Patent
Normando et al.

(10) Patent No.: US 9,148,244 B2
(45) Date of Patent: Sep. 29, 2015

(54) METHOD AND APPARATUS FOR ADAPTIVE CANCELLATION OF EXTERNAL INTERFERENCE

(75) Inventors: Paulo G. Normando, Fortaleza-CE (BR); Carlos I. R. Bandeira, Fortaleza-CE (BR); Darlan Cavalcante Moreira, Fortaleza-CE (BR); Walter C. Freitas, Jr., Fortaleza-CE (BR); Yuri C. B. Silva, Fortaleza-CE (BR)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 490 days.

(21) Appl. No.: 13/567,397

(22) Filed: Aug. 6, 2012

(65) Prior Publication Data

US 2014/0036790 A1 Feb. 6, 2014

(51) Int. Cl.
*H04J 11/00* (2006.01)
*H04B 7/02* (2006.01)
*H04B 7/04* (2006.01)
*H04B 15/00* (2006.01)

(52) U.S. Cl.
CPC .......... *H04J 11/0033* (2013.01); *H04B 7/024* (2013.01); *H04B 7/0452* (2013.01); *H04B 7/0456* (2013.01); *H04B 15/00* (2013.01)

(58) Field of Classification Search
CPC .................................................... H04J 11/0033
See application file for complete search history.

(56) References Cited

U.S. PATENT DOCUMENTS

| | | | |
|---|---|---|---|
| 2010/0232553 A1* | 9/2010 | Gomadam et al. | 375/346 |
| 2011/0310827 A1 | 12/2011 | Srinivasa et al. | |
| 2012/0020422 A1* | 1/2012 | Dotzler et al. | 375/260 |
| 2013/0237265 A1* | 9/2013 | Khojastepour et al. | 455/509 |

FOREIGN PATENT DOCUMENTS

| | | | |
|---|---|---|---|
| EP | 1 276 251 A1 | 1/2003 | |
| EP | 1 995 979 A1 | 11/2008 | |

OTHER PUBLICATIONS

Dictionary.com "Definition of the word Analyzer" retrieved Apr. 2, 2015.*
Dictionary.com "Definition of the word Projector" retrieved Apr. 2, 2015.*
Quentin H. Spencer et al., "Zero-Forcing Methods for Downlink Spatial Multiplexing in Multiuser MIMO Channels", IEEE Transactions on Signal Processing, vol. 52, No. 2, Feb. 2004, pp. 461-471.

(Continued)

*Primary Examiner* — Robert M Morlan

(57) ABSTRACT

In MU-MIMO scenarios, uncoordinated or external interference may be very significant. Such external interference can degrade the system performance as much as the internal interference. To address these problems, a desired signal subspace can be changed to avoid the external interference as much as possible. This technique can be applied in conjunction with systems that already cancel internal interference, such as Interference Alignment and Joint Processing. An original signal space may be broken down to desired and interference subspaces that are orthogonal to each other. The receiver can notify the transmitter of the boundary, and transmitter in turn can project the transmitted signal to fall into the desired subspace. The receiver can project the received signal into the desired subspace, which cancels everything not contained in the desired subspace.

28 Claims, 12 Drawing Sheets

(56) References Cited

OTHER PUBLICATIONS

Seijoon Shim et al., "Block Diagonalization for Multi-User MIMO with Other-Cell Interference", IEEE Transactions on Wireless Communications, vol. 7, No. 7, Jul. 2008, pp. 2671-2681.

Ralf Imer et al., "Coordinated Multipoint: Concepts, Performance, and Field Trial Results", IMT-Advanced and Next-Generation Mobile Networks, IEEE Communications Magazine, Feb. 2011, pp. 102-111.

Hakjea Sung et al., "An MMSE based Block Diagonalization for Multiuser MIMO Downlink Channels with Other Cell Interference", School of Electrical Eng., Korea University, Seoul, Korea, IEEE 2009 (5 pages).

Steven W. Peters et al., "Cooperative Algorithms for MIMO Interference Channels", IEEE Transactions on Vehicular Technology, vol. 60, No. 1, Jan. 2011, pp. 206-218.

Viveck R. Cadambe et al., "Interference Alignment and Degrees of Freedom of the $K$-User Interference Channel", IEEE Transaction on Information Theory, vol. 54, No. 8, Aug. 2008, pp. 3425-3441.

H. Huang et al., "Chapter 3: Multiuser MIMO", *MIMO Communication for Cellular Networks*, Springer Science+Business Media, LLC 2012, pp. 79-120.

\* cited by examiner

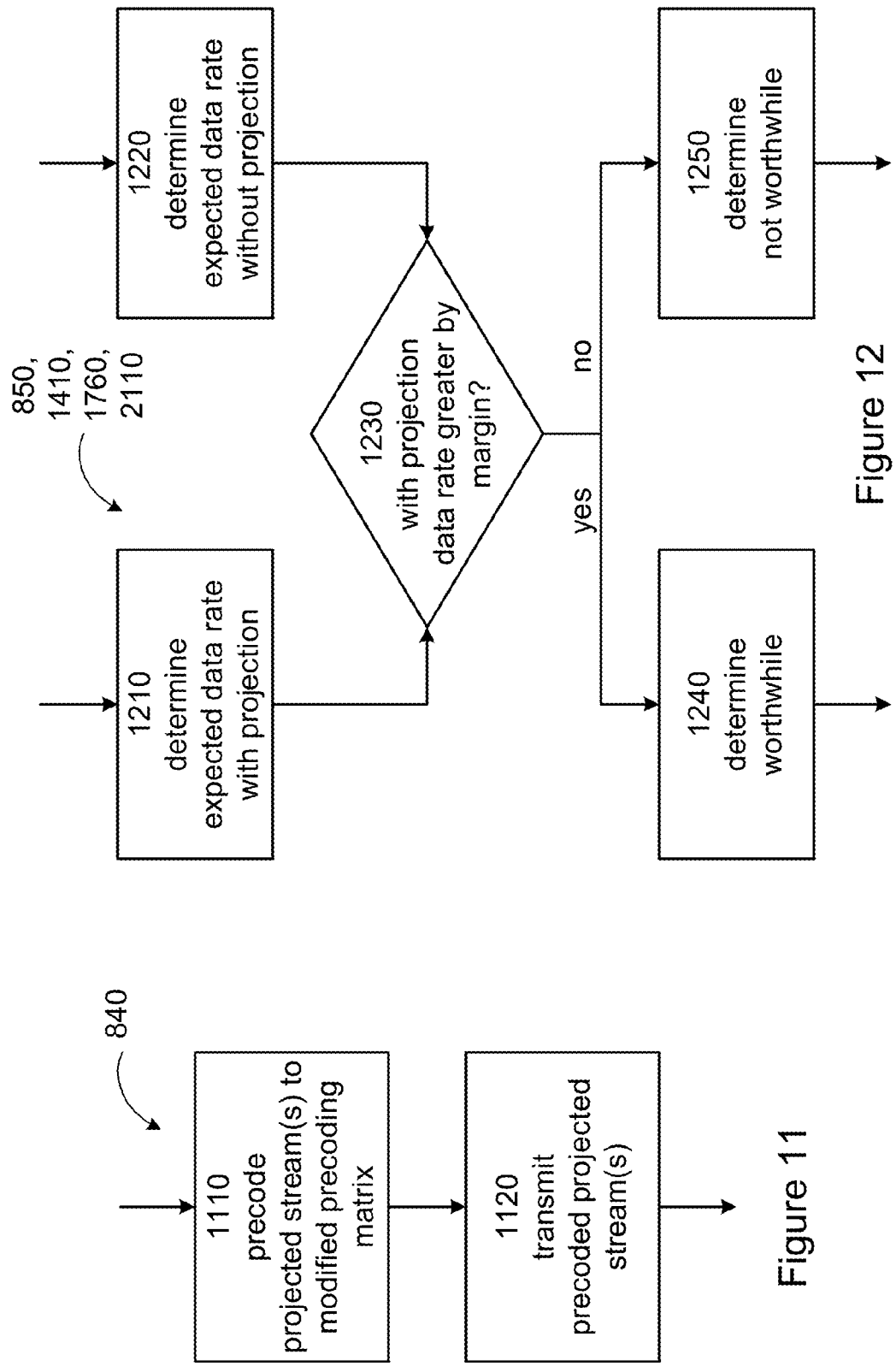

METHOD AND APPARATUS FOR ADAPTIVE CANCELLATION OF EXTERNAL INTERFERENCE

TECHNICAL FIELD

The technical field of the present disclosure generally relates to interference cancellation in wireless communication systems. In particular, techniques to perform adaptive cancellation of external interference are presented.

BACKGROUND

Multiple-Input Multiple-Output (MIMO) technology has increased the throughput of wireless systems due to the added Degrees of Freedom (DoF) which can be achieved by using spatial interference cancellation techniques. The sum capacity of a broadcast channel is achieved by Dirty Paper Coding (DPC). But due to the complexity and difficulty in implementing DPC in practice, several techniques based on the concept of precoding have been proposed offering different trade-offs between complexity and performance.

Block Diagonalization (BD) is an algorithm widely used to mitigate interference in wireless systems. It can be thought of as a generalization of channel inversion for scenarios that consider multiple antennas at reception. BD is one approach for linear precoding in the MIMO broadcast channel that sends multiple interference-free data streams to different users.

This algorithm can be implemented in several cellular scenarios. An example of a scenario is a single cell approach, which is composed of only one base station, equipped with an array of antennas, serving multiple data streams to users in a cell trying to avoid inter-user interference. Much analysis has been done in this scenario, and studies show that in some cases, where BD is combined with user selection algorithms, BD achieves a performance close to DPC.

Another interesting, and also promising, approach is to use BD in a Coordinated Multi-Point (CoMP) scenario, by jointly transmitting signals from multiple base stations. This method consists of grouping some geographically separated base stations that jointly process the signals of the users forming a virtual antenna array. This makes a CoMP transmission, to some extent, similar to the single base station scenario, with the difference being that now the users are located in different cells and the interference is referred to as Inter-cell interference (ICI). Nevertheless, this implies several practical issues on the transmit side, such as the need for a very fast backhaul connecting the base stations and per-base power constraints. This scenario is already considered in LTE-based networks and has been widely studied and assessed in different ways, through simulations and also by field trials.

Although CoMP with joint transmission is able to mitigate interference between multiple users within the CoMP cell, these users can still suffer interference from other systems or CoMP cells. Since this interference is caused by external nodes and cannot be coordinated, it is commonly referred to as uncoordinated or external interference. In new cellular networks, external interference may reach severe levels due to the use of smaller cells. Also, they can degrade the system performance as much as the internal interference.

SUMMARY

A non-limiting aspect of the disclosed subject matter is directed to a method performed in a radio network node of a wireless network to adaptively cancel an external interference. The method can comprise the steps of: receiving an external interference report from a wireless terminal of an external interference experienced by the wireless terminal paired with the radio network node; determining an interference subspace of the wireless terminal based on the external interference report, in which the interference subspace may be a signal subspace that contains substantially all of the external interference of the wireless terminal; projecting a transmit signal of an original transmission subspace substantially entirely onto a desired signal subspace of the wireless terminal based on the interference subspace, in which the desired signal subspace may be orthogonal to the interference subspace; and transmitting the transmit signal to the wireless terminal projected onto the desired signal subspace. The original transmission subspace may correspond to an original transmit stream set comprising a plurality of original transmit streams, and the desired signal subspace may correspond to a projected stream set comprising one or more projected transmit streams. A number of the projected streams in the projected stream set may be less than a number of the original transmit streams in the original transmit stream set.

Another non-limiting aspect of the disclosed subject matter is directed to a non-transitory computer storage medium which has stored therein programming instructions. When a computer of a radio network node executes the programming instructions, the computer executes a method to adaptively cancel an external interference as described above.

Another non-limiting aspect of the disclosed subject matter is directed to a radio network node of a wireless network. The radio network node may be structured to adaptively cancel an external interference. The radio network node may comprise a controller, a transceiver, a communicator, an interference analyzer and a projector 650.

Another non-limiting aspect of the disclosed subject matter is directed to a method performed in a wireless terminal to adaptively cancel an external interference. The method may comprise the steps of determining an external interference experienced by the wireless terminal; sending an external interference report corresponding to the external interference to a radio network node paired with the wireless terminal; determining an interference subspace of the wireless terminal based on the external interference, in which the interference subspace may be a signal subspace that contains substantially all of the external interference of the wireless terminal; projecting a received signal of an original receive subspace substantially entirely onto a desired signal subspace of the wireless terminal based on the interference subspace, in which the desired signal subspace may be orthogonal to the interference subspace; and receiving the received signal projected onto the desired signal subspace. The original receive subspace may correspond to an original receive stream set comprising a plurality of original receive streams, and the desired signal subspace may correspond to a projected stream set comprising one or more projected transmit streams. A number of the projected streams in the projected stream set may be less than a number of the original receive streams in the original receive stream set, and also may be less than a number of the original transmit streams in an original transmit stream set of the paired radio network node.

Yet another non-limiting aspect of the disclosed subject matter is directed to a non-transitory computer storage medium which has stored therein programming instructions. When a computer of a wireless terminal executes the programming instructions, the computer executes a method to adaptively cancel an external interference as described above.

Another non-limiting aspect of the disclosed subject matter is directed to a wireless terminal structured to adaptively cancel an external interference. The wireless terminal may comprise a controller, a transceiver, an interference analyzer and a projector.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

FIG. 11 illustrates a flow chart of an example process performed at a radio network node to transmit a transmit signal projected onto a desired signal subspace;

FIG. 12 illustrates a flow chart of an example process to determine whether a projection is worthwhile;

DETAILED DESCRIPTION

Figure 2:
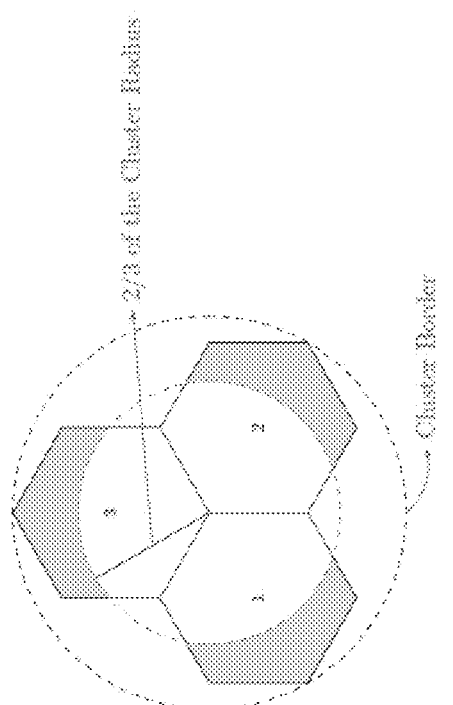
FIG. 2 illustrates a multiple user interference channel scenario for a simulation corresponding to a single cluster with three cells.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, HSPA—are used as examples for explanation purposes. Note that the technology described herein can be applied to non-3GPP standards, e.g., IS-95, cdma2000, 1xEVDO, etc. Thus, the scope of this disclosure is not limited to the set of 3GPP wireless network systems and can encompass many domains of wireless network systems. Also, a radio network node (e.g., base station, BS, RBS, NodeB, NB, eNodeB, eNB, etc.) will be used as an example of a network node in which the described method can be performed. However, it should be noted that the disclosed subject matter is applicable to any node, such as relay stations, that receive wireless signals. Also without loss of generality, mobile terminals (e.g., UE, mobile computer, PDA, etc.) will be used as examples of wireless terminals that communicate with the radio network node.

As indicated above, in multi-user MIMO (MU-MIMO) scenarios, uncoordinated or external interference may be very significant, due at least in part to the use of smaller cells. Such external interference can degrade the system performance as much as the internal interference.

In as far as the inventors are aware, not many studies have considered a scenario with a substantial level of external interference when evaluating the BD algorithm. Even less have proposed techniques or modifications to BD to overcome or mitigate the external interference problem. BD algorithms may use statistics of the interference to design a whitening filter or to implement an MMSE-based approach. Also, these conventional methods perform no adaptation of the number of transmitted streams, i.e., in situations of high external interference, the system still tries to transmit all streams.

To address some or all issues of the conventional interference cancelling methods, the disclosed subject matter relates, at least in part, to adapting the desired signal subspace (for instance, a subset of the space dimensions in a MIMO system) to the characteristics of the external interference. In one or more non-limiting aspects, the desired signal subspace is changed to avoid the external interference as much as possible. This technique can also be applied in conjunction with systems that already cancel internal interference, such as Interference Alignment or Joint Processing (e.g., BD technique employed in CoMP transmission).

An aspect of the adaptation technique may be described as follows. From a perspective, an original signal space (or simply "signal space") may be broken down to two orthogonal subspaces—a desired signal subspace (or "desired subspace") and an interference signal subspace (or "interference subspace"). Since the receiver is the one that experiences the interference, it is in a better position to determine the boundary between the two subspaces such that the interference (or most of it) is contained in the interference subspace. The receiver can notify the transmitter of the boundary. The transmitter in turn can project the transmitted signal to fall into (or mostly into) the desired subspace. At the receiver, the received signal can be viewed as an entirety of the signal it receives. In other words, the received signal can be viewed as being spread into the whole signal space. The receiver can project this received signal into the desired subspace, which then cancels everything not contained in the desired subspace (cancels information contained in the interference subspace).

In the proposed technique, the direction or directions in which the receivers (e.g., user equipments (UE) in the downlink; radio network nodes in the uplink) perceive most of the external interference energy are estimated. For example, the receivers may estimate the external interference covariance matrix. One goal (of which there can be several) of the proposed technique is to align the transmit signal in such a way that it is as orthogonal as possible to the subspace of the external interference that each receiver perceives. The exact procedure to do this may be different depending on which system is considered.

For the remainder of this document, the term "user" will be used to indicate a transmitter-receiver pair. That is, each transmitter is paired with a corresponding intended receiver, and each receiver is paired with a corresponding intended transmitter. Then phrases such as "unintended users", "unintended transmitters" and "unintended receivers" should be clear. Note that the term "other" users-transmitters-receivers can be interpreted to be synonymous with "unintended."

In a system where Interference Alignment (IA) is employed, in order to cancel the internal interference, each user can determine its own interference subspace where all other users must project their signals onto. The technique then can correspond to aligning each user's interference subspace with the subspace where most of the external interference is projected. This makes the external interference similar, at least in the direction, to the internal interference handled by the IA technique.

On the other hand, in a system where BD is performed, a technique to align the user's equivalent channel, after the BD, to the subspace orthogonal to the external interferences subspace is proposed. The orthogonal subspace can be referred to as the "signal subspace". This can be achieved by an additional projection step. The receiver then may simply project the received signal onto the desired signal subspace thus eliminating or at least substantially mitigating the external interference.

One potential cost associated with this technique is that, since the signal is now projected onto a subspace of the equivalent channel, some dimensions may be sacrificed in order to cancel the external interference. This is explained as follows. As indicated above, a union of the desired and the interference subspace form the whole signal space. By definition, these two subspaces do not intersect with each other. If the dimension of the interference subspace is increased (e.g., so that more of the interference can be captured), then the dimension of the desired subspace should be decreased. In a preferred embodiment, the transmitted signal is projected to be limited (or mostly limited) to the desired subspace. Then the reduction in the dimension of the desired subspace can correspond to sacrificing some of the streams of the transmitted signal.

Sacrificing of the streams may alternatively be explained as follows. A transmit signal—i.e., a signal to be transmitted from the radio network node 510 to the intended wireless terminal 520—may comprise a plurality of original transmit streams and occupy an original transmission subspace. One or more of these original transmit streams may be in the interference subspace, i.e, the original transmission subspace of the transmit signal may intersect with the interference subspace of the wireless terminal 520. When this occurs, the transmit signal may be projected such that the projected streams are outside of the interference subspace. One way to achieve this is to not utilize or sacrifice any original transmit stream within the interference subspace.

In the disclosed subject matter, it is contemplated how the system can adapt to the external interference. It is also contemplated to determine whether it is worth to switch to a lower dimensional subspace, which is orthogonal to the subspace containing the external interference.

Figure 1:
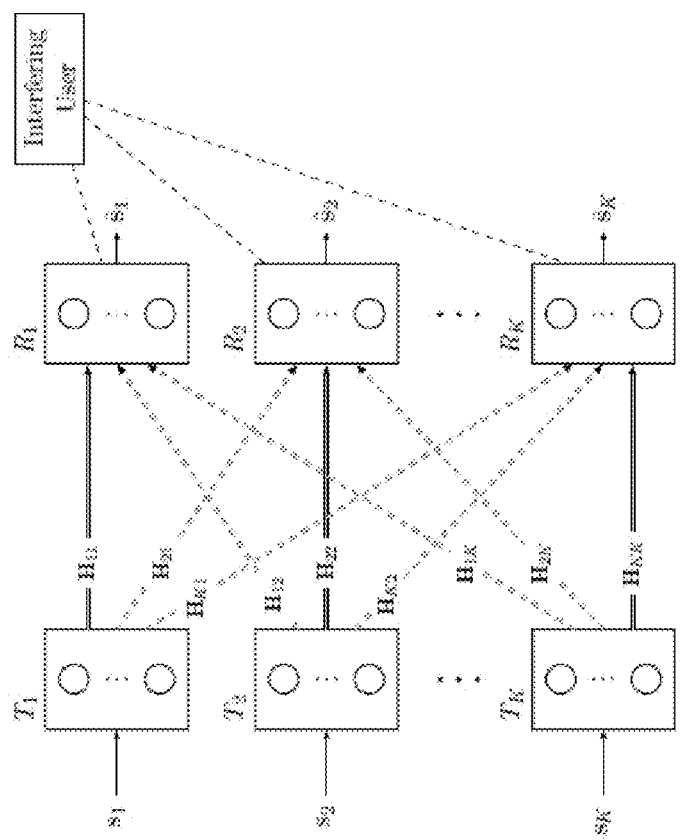
FIG. 1 illustrates an example system with mutually interfering users as well as the external interference.

Consider a system with K mutually interfering users as shown in FIG. 1, a "user" is addressed as a specific transmit/receive pair and the circles correspond to the number of available dimensions (space dimensions, frequency dimensions, time dimensions, etc.). The solid lines correspond to the direct channel for the users (between intended transmitter-receiver pairs) while the dashed lines correspond to interference caused at the unintended receivers. In this document, the external interference is addressed. It is assumed that the internal (coordinated) interference is handled by other known techniques such as IA or BD. When IA is employed then the received signal at the i th receiver can be written as $$y_i = H_{ii} V_i d_i + \sum_{j=1, i \neq j}^{K} H_{ij} V_j d_j + n_i + e_i. \tag{1}$$

In (1), $H_{ij}$ is the channel between the j th transmitter and the i th receiver, $V_i$ is a precoder of the i th user, $d_i$ is the i th user's data, K is the number of users, and $n_i$ and $e_i$ are the noise and the external interference, respectively, experienced by the i th user. The summation in (1) corresponds to the internal interference experienced by the i th user.

When the external interference is not considered, this model is widely studied in the IA literature. Generally in IA, each user determines its signal subspace" (not to be confused with signal space) and an interference subspace. Each user then chooses its precoder such that it projects that user's signal onto the interference subspace of an unintended receiver. This makes each receiver perceive all of the interference from the unintended transmitters as a single source of interference. Since the signal and interference subspaces are orthogonal by definition, then the receivers can completely eliminate the internal interference as long as the alignment made by the transmitters is perfect.

In a system with three users, the IA conditions can be written as $$\text{span}(H_{12}V_2) = \text{span}(H_{13}V_3) \quad (2)$$

$$\text{span}(H_{21}V_1) = \text{span}(H_{23}V_3) \quad (3)$$

$$\text{span}(H_{31}V_1) = \text{span}(H_{32}V_2) \quad (4)$$

or more specifically, $$\text{span}(H_{1,2}V_2) = \text{span}(H_{1,3}V_3) \quad (5)$$

$$H_{2,1}V_1 = H_{2,3}V_3, H_{3,1}V_1 = H_{3,2}V_2 \quad (6)$$

However, when there is an external interference that did not participate in the IA process, then each receiver cannot eliminate the interference anymore since part of the external interference will fall into the user's signal subspace.

On the other hand, when Joint Processing (JP) is performed, there is a communication link between the multiple transmitters and they can act as a single transmitter with more available dimensions. A common way to take advantage of the Joint Processing is through the BD algorithm. The received signal at receiver i when BD is employed can then be written as $$y_i = \sum_{j=1}^{K} H_i M_j d_j + n_i + e_i = H_i M_i d_i + H_i \tilde{M}_i \tilde{d}_i + n_i + e_i \quad (7)$$

In (7), $H_i$ is the channel between all transmitters and the i th user, $M_i$ is a precoder matrix for the i th user, $\tilde{M}_i = [M_1, \ldots, M_{i-1}, M_{i+1} \ldots M_K]$ and $\tilde{d}_i = [\tilde{d}_1^T, \ldots, \tilde{d}_{i-1}^T, \tilde{d}_{i+1}^T \ldots \tilde{d}_K^T]^T$. The main difference from IA is that the precoder in BD operates on the transmit antennas of all users. This system model becomes similar to a single user MIMO system, but without the cooperation among the receivers. The interference among the users ($H_i \tilde{M}_i \tilde{d}_i$) is then previously canceled at the transmitter side through the BD algorithm. But as mentioned above, the conventional BD algorithm does not take into account the external interference $e_i$.

However, in an example inventive method, the user's signal can be limited to a subspace orthogonal to the subspace where the external interference lies. This idea is similar to how IA cancel the internal interference, but obviously the external interference source does not cooperate in anyway as is the case with regular IA. When BD is employed, the method can include projecting the equivalent channel, from the BD process for example, onto a subspace orthogonal to the interference subspace. Equation (7) then becomes:

$$y_i = \sum_{j=1}^{K} H_i M_j P_j d_j + n_i e_i = H_i M_i P_i d_i + \sum_{j=1, j \neq i}^{K} H_i M_j P_j d_j + n_i + e_i \quad (8)$$

In (8), p is a linear transformation from an original signal space to a lower dimensional subspace of dimension $N_i$ that is orthogonal to the subspace that contains the external interference. Here, $N_i$ represents the number of streams that i th user will transmit. This linear transformation is here referred to as a "projection". Since the projection can involve reducing the dimension (e.g., number streams) of the equivalent channel that the receiver will see, it is preferred that the method also involves determining whether such dimension reduction is worth the cost.

An example proposed technique can be summarized into the following steps:

Step 1: Estimate external interference→Each receiver can estimate the covariance matrix $R_{ei}$ of the external interference it sees;

Step 2: Perform the BD algorithm as usual;

Step 3: Perform the projection→For each transmitter, the matrix $P_i$ is given by the $N_i$ least significant right singular vectors of the external interference covariance matrix $R_{ei}$ estimated by the intended receiver;

Step 4: Cancel the external interference→At the receiver, the received signal is projected onto the subspace spanned by the columns of $P_i$. This projection is performed by (left) multiplying the received signal by $\bar{P}_i = P_i P_i^H$.

Step 5: Perform the usual BD reception→Since $H_i M_j = 0$ for $i \neq j$, due to the BD algorithm, and the external interference was canceled by $\bar{P}_i$, then the received signal after external interference cancellation, $\bar{y}_i$ is given by $$\bar{y}_i = \bar{P}_i H_{ieq} d_i + \bar{P}_i n_i \quad (9)$$

In (9), $H_{ieq} = H_i M_i P_i$. Hence, the original symbols can be recovered by the corresponding filter $W_i$ that diagonalizes the equivalent channel seen by i th user. That is $$W_i = (\bar{P}_i H_{ieq})^{\oplus}. \quad (10)$$

In (10), $(\cdot)^{\oplus}$ corresponds to the Moore-Penrose pseudo-inverse operation.

It is not required that all users apply the projection step. The projection can be selectively applied for users that perceive high external interferences. Once the projection matrix $P_i$ is determined, one or more metrics can be used to decide whether to proceed with the projection or not for each user. One metric may be to maximize the expected data rate. For example, if the external interference is substantial, then the capacity may be maximized (e.g., a better throughput may be achieved) by canceling the interference through dimensional reduction even though the number of streams may be reduced. On the other hand, if the external interference is relatively low, then it may be better to use all available dimensions to maximize throughput in spite of the external interference.

An example of a decision metric to maximize the expected data rate is explained as follows. A data rate of a user i in a MIMO system with an external interference is given by $$R_i = \sum_{k=1}^{N_i} \log_2(1 + SINR_{ik}). \quad (11)$$

In (11), $N_i$ is the dimension of the desired signal subspace, $SINR_{ik}$ is the signal to interference plus noise ratio of the k th stream of user i. The term $SINR_{ik}$ in (11) is given by $$SINR_{ik} = \left( \frac{I_{N_i}}{W_i W_i^* N_0 + W_i R_{ei} W_i^*} \right)_{k,k}, \quad (12)$$

where $N_0$ is the noise power spectral density, $W_i$ is the reception filter for user i, $I_{N_i}$ is an identity matrix of dimension $N_i$, and $R_{ei}$ is the covariance matrix of the external interference, and $(A)_{k,k}$ is the k th element in the diagonal of a matrix A.

When the projection is performed, the dimension of the signal subspace, $N_i$, will be lower then the original signal space dimension, the external interference is substantially eliminated and $W_i$ is the receive filter from (10). On the other hand, when the projection is not performed, then $N_i$ will be the dimension of the original signal space and $W_i$ is the receiver filter for a regular block diagonalization, such as $W_i=(H_iM_i)^\Theta$. By comparing the data rate values $R_i$ with and without the projection, it can be decided whether a projection should be performed for the i th user.

Of course, there can be considerations other than or in addition to the metric arrived at through equations (11) and (12) when deciding whether to use projection or not. For example, it may be computationally more expensive to transmit with projection since additional calculations to project the signals are likely necessary. Thus, in one alternative, it may be decided to project when the performance due to the projection is greater than the performance without projection by a predetermined amount or higher. In another alternative, if a power requirement of using the projection is different from the power requirements when the projection is not used, then appropriate switching point may be determined based on the requirements in addition to the calculated performances.

Figure 5:
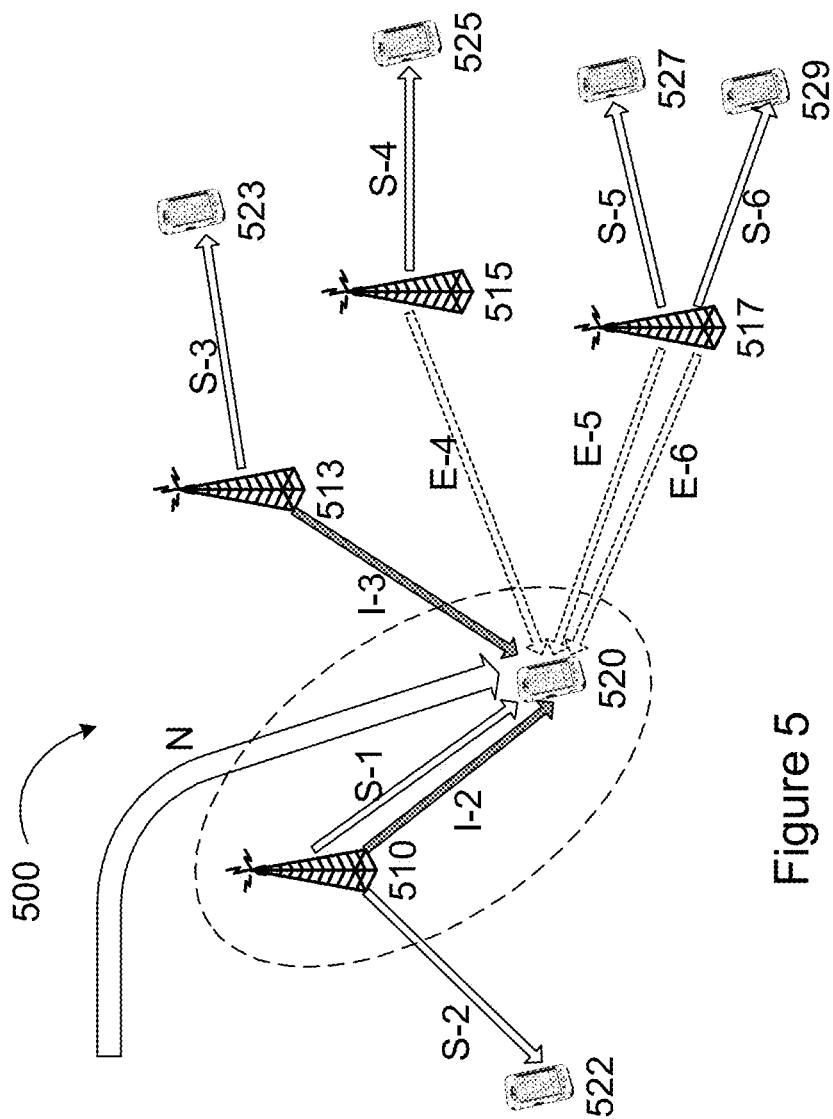
FIG. 5 illustrates an example scenario in which adaptive cancellation of external interference may be performed.

FIG. 5 illustrates an example scenario in which adaptive cancellation of external interference may be performed. In this figure, a wireless network 500 is shown to include radio network nodes 510, 513, 515 and 517 and wireless terminals 520, 522, 523, 525, 527 and 529. In FIG. 5, the focus is on the transmitter/receiver pair made up of the radio network node 510 and the wireless terminal 520. It is assumed that the radio network node 510 is coordinated with the radio network node 513, but is not coordinated with either the radio network node 515 or 517.

In the downlink, there are six (6) transmitter/receiver pairs indicated with solid white arrows:

Transmitter 510-receiver 520 (signal S-1);
Transmitter 510-receiver 522 (signal S-2);
Transmitter 513-receiver 523 (signal S-3);
Transmitter 515-receiver 525 (signal S-4);
Transmitter 517-receiver 527 (signal S-5);
Transmitter 517-receiver 529 (signal S-6).

Note that the signal S-3 transmitted from the radio network node 513 intended for the wireless terminal 523 can also reach the wireless terminal 520 and thus interfere with the wireless terminal 520. Since the radio network node 510 and 513 are coordinated, such interference is an internal interference and is indicated with a solid shaded arrow labeled I-3. Note that S3 and I3 are one and the same signal. The label I-3 is there simply to indicate that from the from the perspective of the intended wireless terminal 520, the signal I-3 is a form of an internal interference from the perspective of the intended wireless terminal 520. Note that the signal S-2 transmitted from the radio network node 510 intended for the wireless terminal 522 can be another form of the internal interference I-2 to the wireless terminal 520.

However, since the radio network node 510 is not coordinated with the radio network nodes 515 and 517, the signals intended for the wireless terminals 525 (S-4 from the radio network node 515), 527 (S-5 from the radio network node 517) and 529 (S-6 from the radio network node 517) reaching the wireless terminal 520 (E-4, E-5 and E-6 shown as dashed arrows) are forms of external interferences from the perspective of the wireless terminal 520. The large white arrow N in the figure with no particular source represents noise. The example proposed technique described can be used to project the signal S-1 from the radio network node 510 to adaptive cancel external interferences (E-4, E-5 and E-6) at the wireless terminal 520.

Figure 6:
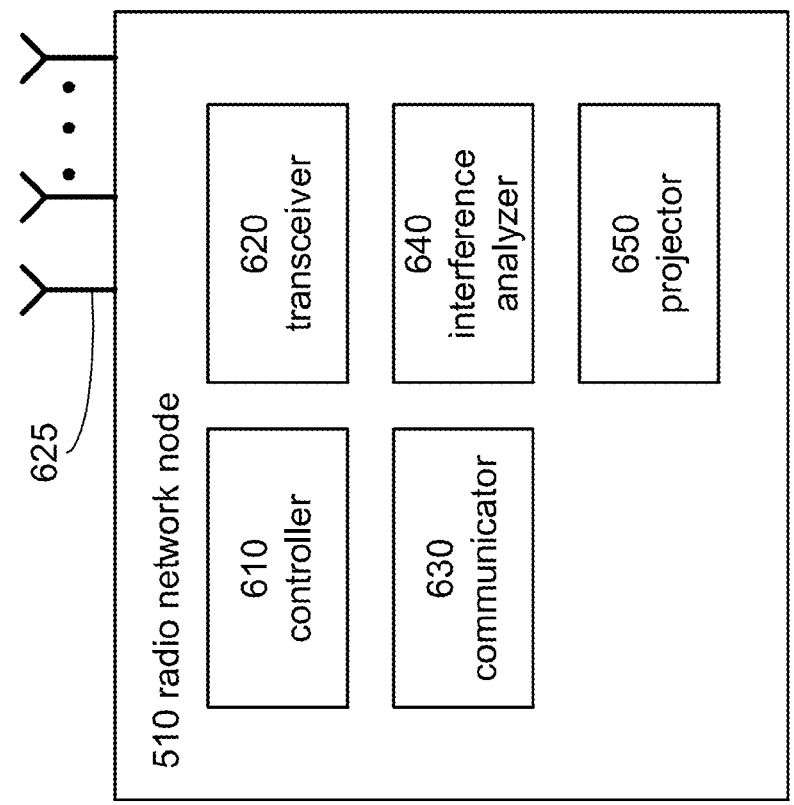

FIG. 6 illustrates an example embodiment of a radio network node 510. The radio network node 510 may comprise several devices including a controller 610, a transceiver 620, a communicator 630, an interference analyzer 640 and a projector 650. The transceiver 620 may be structured to wirelessly communicate with wireless terminals 520. The communicator 630 may be structured to communicate with other network nodes and with core network nodes. The interference analyzer 640 may be structured to analyze interferences including both internal and external interferences. The projector 650 may be structured to project a signal of a signal space to a desired signal subspace. The controller 610 may be structured to control the overall operations of the radio network node 510.

FIG. 6 provides a logical view of the radio network node 510. It is not strictly necessary that each device be implemented as physically separate modules or circuits. Some or all devices may be combined in a physical module. Also, one or more devices may be implemented in multiple physical modules.

Figure 7:
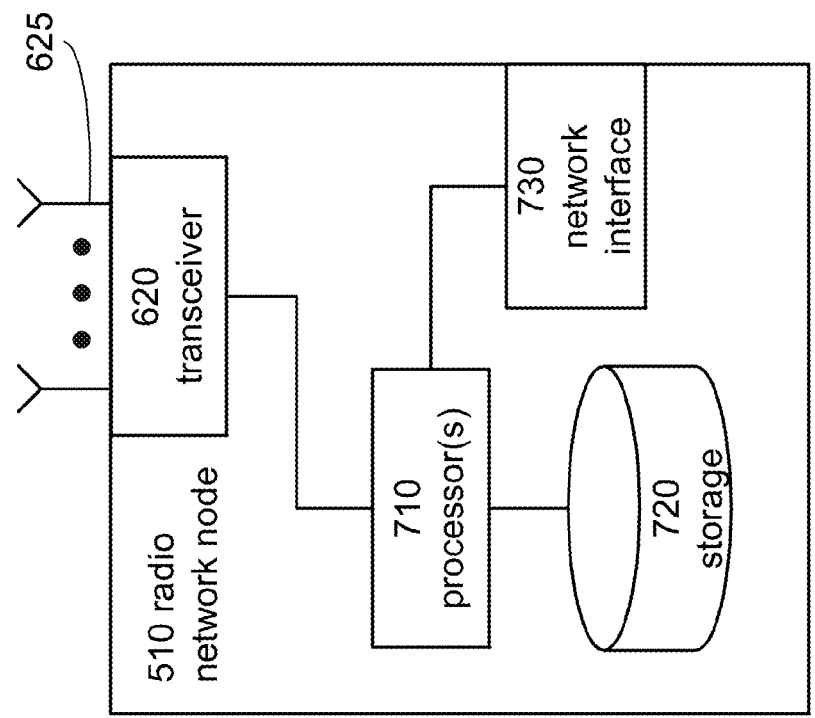
FIGS. 6 and 7 respectively illustrate example embodiments of a radio network node.

The devices of the radio network node 510 as illustrated in FIG. 6 need not be implemented strictly in hardware. It is envisioned that any of the devices maybe implemented through a combination of hardware and software. For example, as illustrated in FIG. 7, the radio network node 510 may include one or more central processing units 710 executing program instructions stored in a storage 720 such as non-transitory storage medium or firmware (e.g., ROM, RAM, Flash) to perform the functions of the devices. The program instructions may also be provided as a signal. The radio network node 510 may also include a transceiver 620 structured to receive wireless signals from the wireless terminals 520 and to send signals to the wireless terminals 520 over one or more antennas 625 in one or more channels. The radio network node 510 may further include a network interface 730 to communicate with other network nodes such as the core network nodes.

Figure 8:
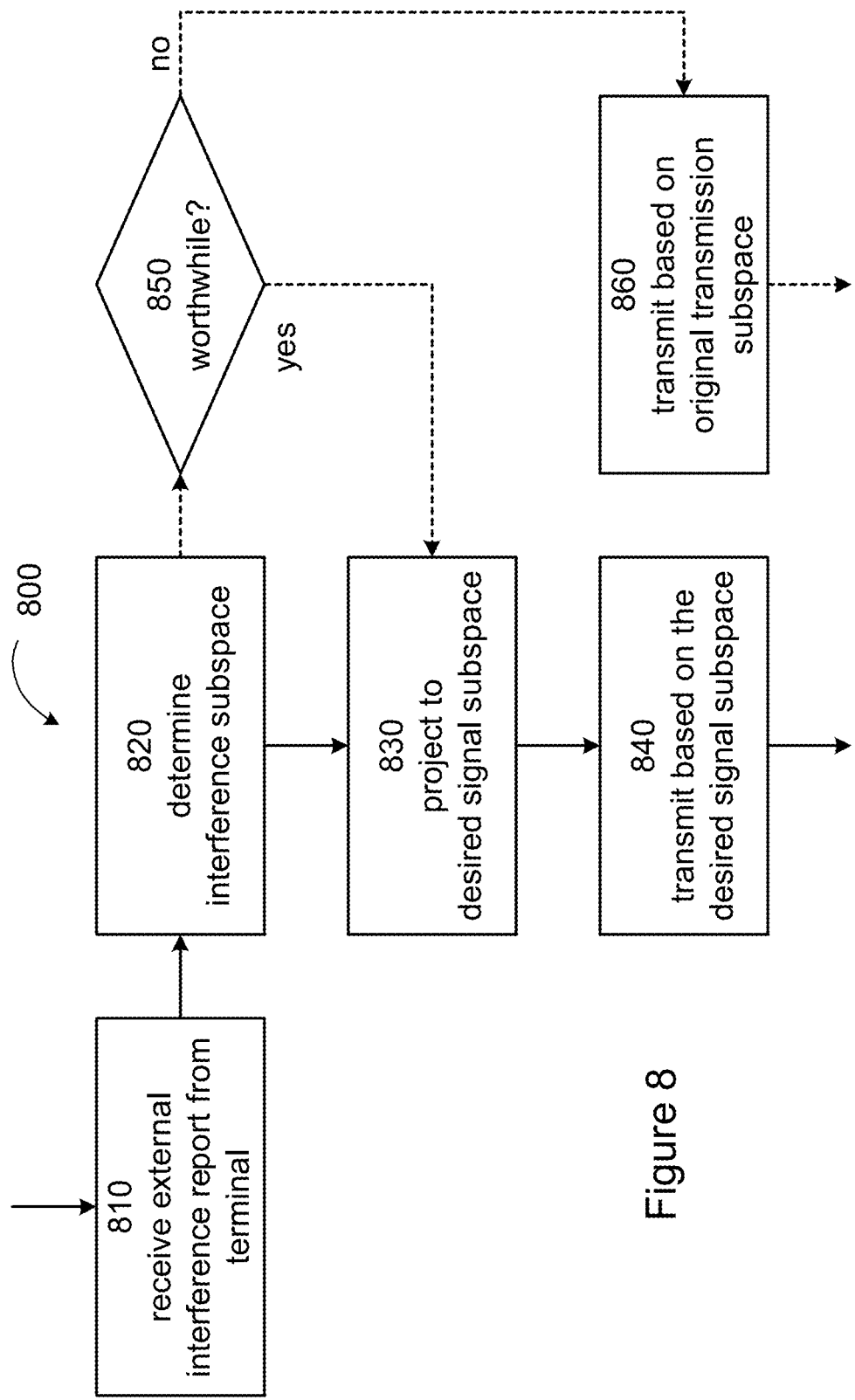
FIG. 8 illustrates a flow chart of an example method performed at a radio network node to adaptively cancel external interference.

FIG. 8 illustrates a flow chart of an example method 800 performed at a radio network node 510 of a wireless network 500 to adaptively cancel external interferences of a wireless terminal 520. The wireless terminal 520 may be assumed to be paired with the radio network node 510. The method 800 may be performed by any combination of devices of the radio network node 510. As indicated above, the adaptation involves, at least one aspect, changing the desired signal subspace to avoid the external interference as much as possible. In step 810, the interference analyzer 640 may receive via the transceiver 620 an external interference report from the paired wireless terminal 520. The external interference report can include information regarding an external interference as experienced by the wireless terminal 520. In one aspect, the external interference report can include an estimated covariance matrix $R_{ei}$ of the external interference.

In step 820, the interference analyzer 640 may analyze the external interference report to determine an interference subspace of the wireless terminal 520. The interference subspace determined in this step is a signal subspace that contains all or substantially all of the external interference of the wireless terminal 520.

From one perspective, determining the interference subspace may be viewed as determining the direction or directions of the external interference. Such information can be recovered from estimated covariance matrix $R_{ei}$. But this is not the only possibility. Any information can be used as long as the information can be analyzed to extract the direction(s) of the external interference, and such information may be included in the external interference report provided by the wireless terminal 520 in step 810. For example, the wireless terminal 520 may explicitly provide the information.

In step 830, the projector 650 may project the signal to be transmitted to the wireless terminal 520 (also referred to as the transmit signal) entirely or substantially entirely onto the desired signal space. As mentioned above, the desired space is a signal subspace that is orthogonal to the to the interference subspace. In step 840, transceiver 620 may transmit the transmit signal to the wireless terminal 520 projected onto the desired signal subspace.

Figures 9, 10:
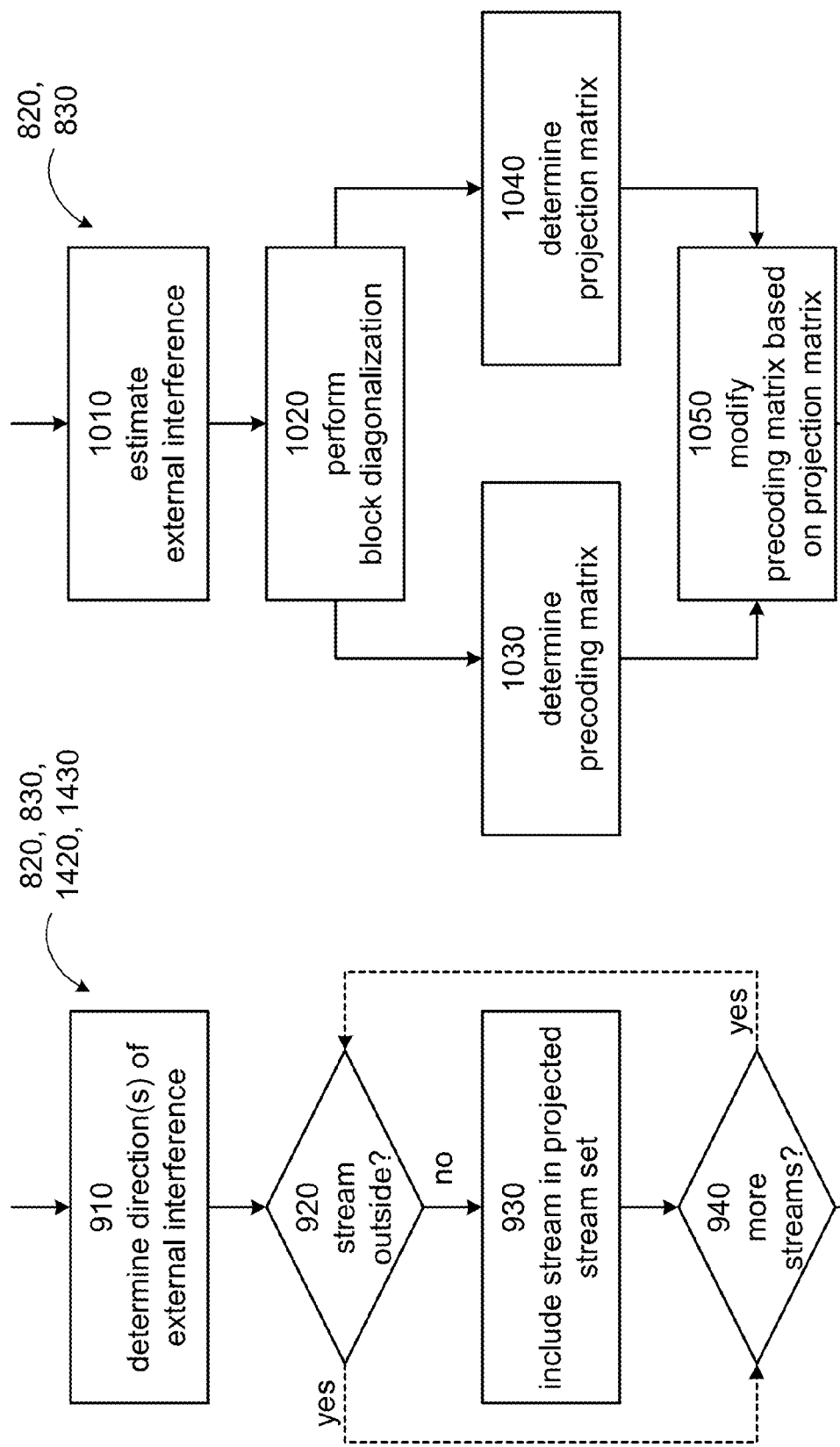
FIG. 9 illustrates a flow chart of an example process performed at a radio network node to determine an interference subspace and to project a transmit signal to a desired signal subspace.
FIG. 10 illustrates a flow chart of another example process performed at a radio network node to determine an interference subspace and to project a transmit signal to a desired signal subspace.

FIG. 9 illustrates a flow chart of an example process to implement the steps 820 and 830. In this example process, the transmitted signal is projected to avoid or substantially avoid the directions of the external interference.

As seen, in step 910, the interference analyzer 640 may determine the direction(s) of the external interference based on the external interference report. More detail on this step will be provided below. Recall that the transmit signal can comprise a plurality of original transmit streams and that the transmit signal after projection can include one or more projected streams. For ease of reference, the original transmit streams will be referred to as the original transmit stream set and the projected streams will be referred to as the projected stream set. The original transmit stream set can correspond to the original transmission space and the desired signal subspace can correspond to the projected stream set. In one aspect, each original transmit stream may be projected or transformed.

In step 920, the interference analyzer 640 may determine whether an original transmit stream of the original transmit stream set is substantially outside of the direction(s) of the external interference. If so, then in step 930, the projector 650 may include that original transmit stream into the projected stream set. Then in step 940, it is determined whether there are more original transmit streams in the original transmit stream set. If so, the 920, 930, 940 are repeated. In this way, the streams that are in the interference subspace may be sacrificed. After the process completes, i.e., after the projection, the number of the projected streams in the projected stream set may be less than the number of the original transmit streams in the original transmit stream set. Then the step 840 of transmitting the transmit signal becomes simply transmitting the projected streams.

FIG. 10 illustrates a flow chart of another example process to implement the steps 820 and 830. The process illustrated in this figure is an example where BD is employed to avoid the external interference. This process may be generally described as aligning the user's equivalent channel after the block diagonalization to the subspace orthogonal to the external interference subspace.

In step 1010, the interference analyzer 640 may estimate the external interference. In one embodiment, the direction(s) of the external interference may be estimated. The external interference report may include an estimated covariance matrix $R_{ei}$ of the external interference. Mathematically, the matrix $R_{ei}$ may be decomposed into three (3) matrices U, S, and V by a singular value decomposition, such that $R_{ei}=USV^*$, where $(\ )^*$ denotes conjugate transpose. The columns of the matrix U are referred to as left singular vectors, while the columns of matrix V are referred to as right singular vectors. S is a diagonal matrix and the elements in its diagonal are referred to as singular values.

In step 1020, the projector 650 may perform a block diagonalization process on the transmit signal. In an aspect, the transmit signal—the original transmit streams and the original transmission subspace—may be determined such that multiuser interferences are minimized.

In step 1030, the projector 650 may determine a precoding matrix $M_i$ based on the block diagonalization process. In one aspect, the block diagonalization is performed so as to substantially eliminate multiuser interferences. The dimension of the precoding matrix $M_i$ may correspond, e.g., should be equal, to the number of the original transmit streams of the original transmit stream set.

In step 1040, the projector 650 may determine a projection matrix $P_i$ based on one or more right singular vectors of the estimated covariance matrix $R_{ei}$, i.e., based on one or more columns of the matrix V. The right singular vectors are an examples of an orthogonal basis of the desired signal subspace that can be obtained. The projection matrix $P_i$ may then be a submatrix of V corresponding to the columns in V that match the least significant singular values in the diagonal matrix S. The number of columns in $P_i$ can be equal to the number of streams transmitted by user i. In other words, the number of columns in $P_i$ can be equal to the number of projected streams from the radio network node 510 to the paired wireless terminal 520.

Steps 1030 and 1040 are illustrated to be performed in parallel only to indicate that neither step is dependent on the results of the other. Thus, these steps may be performed in any order or in parallel.

In step 1050, the projector 650 may modify the precoding matrix $M_i$ based on the projection matrix $P_i$ to arrive at a modified precoding matrix $\overline{M}_i$. Note that the number of columns of the modified precoding matrix $\overline{M}_i$ is $N_i$ representing the number of the projected data streams. Moreover, the number of the projected streams in the projected stream set is less than a number of the original transmit streams in the original transmit stream set.

An example may serve as an explanation. Consider a system with 2 users (i.e., two transmit/receive pairs), each user with 3 transmit antennas. Of course, these numbers can be different. Let $N_t$ be a sum of the number of antennas of all users. In this instance, $N_t=6$ and the precoding matrix $M_i$ will have a dimension equal to $N_t \times 3$ where 3 is the size of the original transmission subspace. If one dimension is sacrificed in the projection, then the projection matrix $P_i$ will have a dimension equal to 3×2. Therefore, the original precoding matrix $M_i$ from the BD process (step 1020) will be mapped into the modified precoding matrix $\overline{M}_i$, which is of a lower dimension subspace, by the projection matrix $P_i$ matrix. As a result, the dimension of the original transmission subspace of the user i went from 3 to 2 (i.e., $N_i=2$).

FIG. 11 illustrates a flow chart of an example process to implement the step 840 to transmit the transmit signal projected onto a desired signal subspace when BD is employed. In step 1110, the projector 650 may precode each projected stream of the projected stream set based on the modified precoding matrix $\overline{M}_i$. In step 1120, the projector 650 via the transceiver 620 may transmit the precoded projected streams to the wireless terminal 520.

Referring back to FIG. 8, once the interference subspace is determined in step 820, the method 800 may proceed directly to steps 830 and 840 to project the signal to the desired signal subspace and to transmit the transmit signal projected onto the desired subspace.

But recall from the discussion above that there is a cost or tradeoff associated with the projection technique in that dimensions may be sacrificed, e.g., the number of transmit streams may be reduced. Depending on the circumstances, such tradeoff may or may not be beneficial. In noisy environments (such as at a cell edge, high number of other receivers, low SNR), such signal space reduction may actually result in a better quality of service (higher throughput, higher capacity, less errors, etc.), and thus the tradeoff may be worthwhile. But in a relatively clean environment (in the vicinity of a cell tower, low number of other receivers, high SNR), the reduction in external interference may not be big enough to warrant the tradeoff.

In FIG. 8, the controller 610 in step 850 may determine whether the projection is worthwhile. This determination may be based on one or more quality of service (QoS) parameters such as throughput, capacity, error rates, and so on. The step 840 of transmitting the transmit signal may be performed only when it is determined that the projection is worthwhile. If it is determined that the projection is not worthwhile in step 850, then in step 860, the transceiver 620 may transmit the transmit signal to the wireless terminal 520 based on the original transmission subspace.

FIG. 12 illustrates an example process to implement the step 850. In steps 1210 and 1220, the controller 610 may determine an expected capacity or data rate with projection and without projection, respectively. The expected data rate may be calculated thought determining $$R_i = \sum_{k=1}^{N_i} \log_2(1 + SINR_{ik}), \text{ with } SINR_{ik} = \left(\frac{I_{N_i}}{W_i W_i^* N_0 + W_i R_{ei} W_i^*}\right)_{k,k}$$

(see equations 11 and 12). In one aspect, the expected data rate with projection may be determined by using a receive filter $W_i = (P_i H_i M_i P_i)^\theta$. In another aspect, the expected data rate without projection may be determined by using a receive filter $W_i = (H_i M_i)^\theta$. In these equations, $R_i$ may represent the expected data rate with projection (using the first receive filter equation) and without projection (using the second receive filter equation). $I_{N_i}$ may represent an identity matrix with dimensions $N_i \times N_i$, where $N_i$ can represent the dimension of the desired signal subspace when the projection is performed or the dimension of the original signal space when the projection is not performed. Also, $N_0$ may represent the noise power spectral density, $H_i$ may represent the channel from all transmitters to receiver i.

In step 1230, the controller 610 may determine whether the expected capacity with projection is greater than the expected data rate without projection by at least a threshold capacity margin. If the expected capacity with projection is greater than the threshold capacity margin, the controller 610 may determine that the projection is worthwhile in step 1240. Otherwise, the controller 610 may determine that the projection is not worthwhile.

The threshold capacity margin may account for other factors involved. For example, there may be computational costs related to the projection. There may also be different power requirements to transmit with projection and without. Note that the threshold capacity margin can take on any value including zero or even a negative value.

Figure 13:
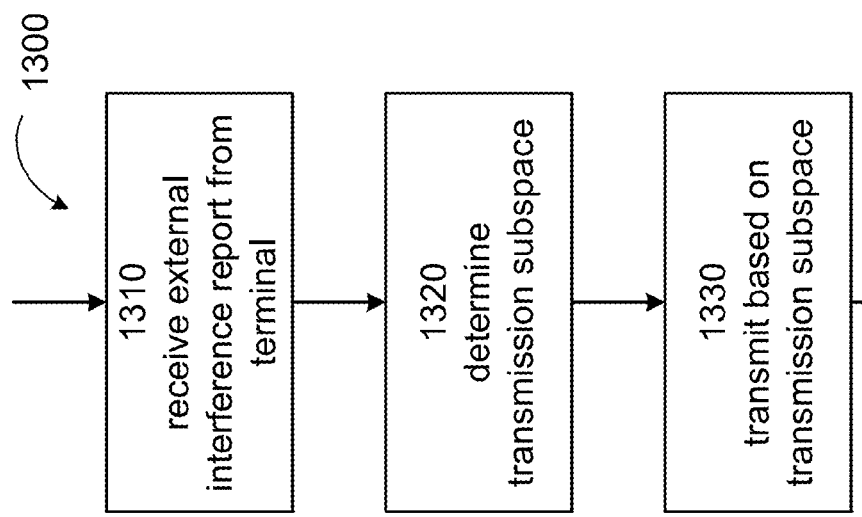
FIG. 13 illustrates a flow chart of another example method performed at a radio network node to adaptively cancel external interference.

FIG. 13 illustrates a flow chart of another example method 1300 performed at the radio network node 510 to adaptively cancel external interferences of a wireless terminal 520. The wireless terminal 520 may be assumed to be paired with the radio network node 510. The method 1300 may be performed by any combination of devices of the radio network node 510. In step 1310, the interference analyzer 640 may receive via the transceiver 620 an external interference report from the paired wireless terminal 520. This step can be similar to step 810 of FIG. 8.

Figure 14:
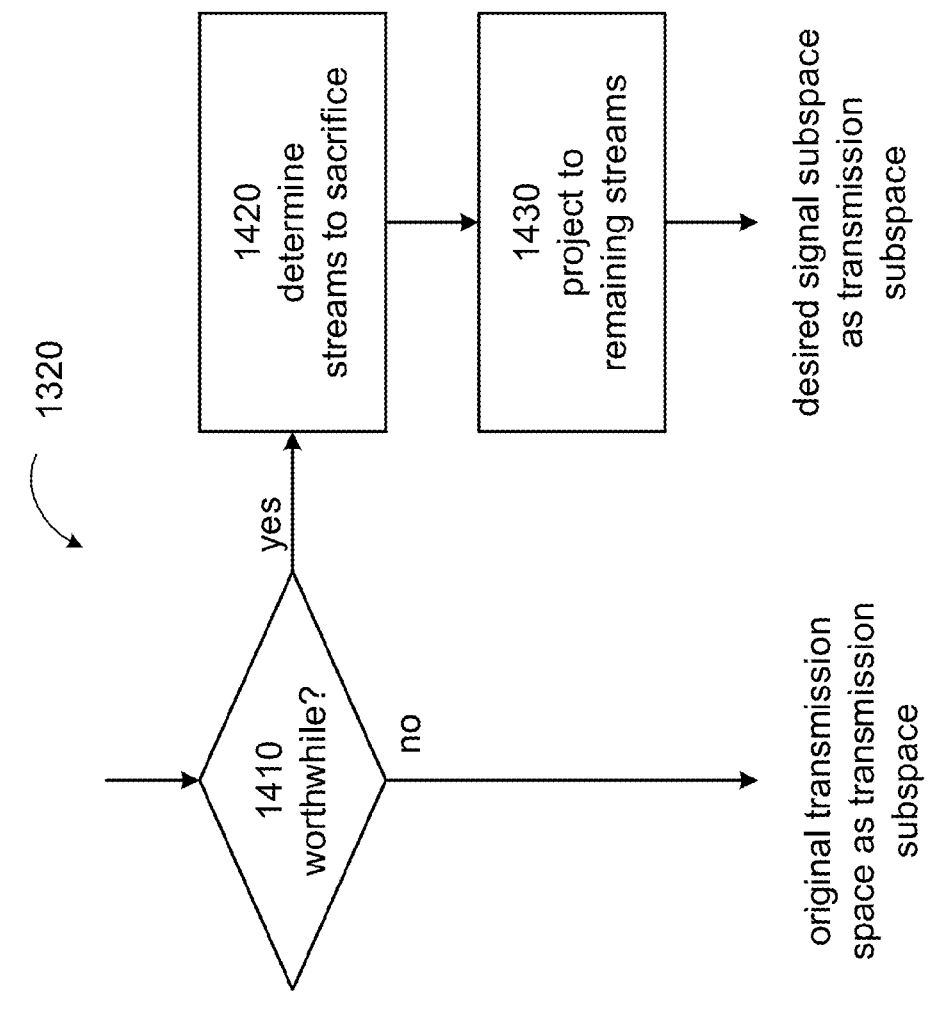
FIG. 14 illustrates a flow chart of an example process performed at a radio network node to determine a transmission subspace.

In step 1320, the radio network node 510 may determine the transmission space based on the interference report. FIG. 14 illustrates and example process to implement the step 1320. As seen, the controller 610 in step 1410 may determine whether the projection is worthwhile. This step may be similar to step 850.

If it is determined that the projection is worthwhile, then in step 1420, the interference analyzer 640 may analyze the external interference report to determine the streams to sacrifice, and in step 1430, the projector 650 may project the signal to the remaining projected streams. The steps of FIGS. 9, 10 and 12 may also be performed to perform the steps 1420 and 1430. The result here can be that the desired signal subspace is the transmission subspace.

On the other hand, if it is determined that the projection is not worthwhile, then the original transmission subspace can be determined to be the transmission space. Referring back to FIG. 13, once the transmission subspace is determined, in step 1330, the transceiver 620 may transmit the transmit signal based on the transmission subspace to the wireless terminal 520. This step may be similar to step 840 (if projected is determined worthwhile) or step 860 (otherwise).

Referring back to FIG. 8, the reader may be left with an impression that somehow, once the interference subspace is determined, the number of streams that are sacrificed is fixed. This is not necessarily the case. FIG. 13 is intended to highlight the decision of whether to sacrifice streams and if so how many to sacrifice as being a significant aspect, and that the interference space is not necessarily fixed.

Note that the number of streams to sacrifice can be any number including zero. That is, what constitutes the interference subspace is not carved in stone. The controller may decide that it is not worth to limit the transmission of useful signal to a given subset of the available dimensions (with the other dimensions capturing some part of all of the interference). From a perspective, the controller can decide to use more dimensions for the desired signal subspace and consequently less dimensions for the interference subspace. In this instance, some interference may leak into this new desired signal subspace than in the previous one, but may be sufficiently weak so as to present little to no problems. When the entirety of the interferences is sufficiently weak such that it is not worth to reserve any dimensions to capture the interferences, then the interference subspace may be determined to be an empty space, and the desired signal space can correspond to the original transmission space.

Figure 15:
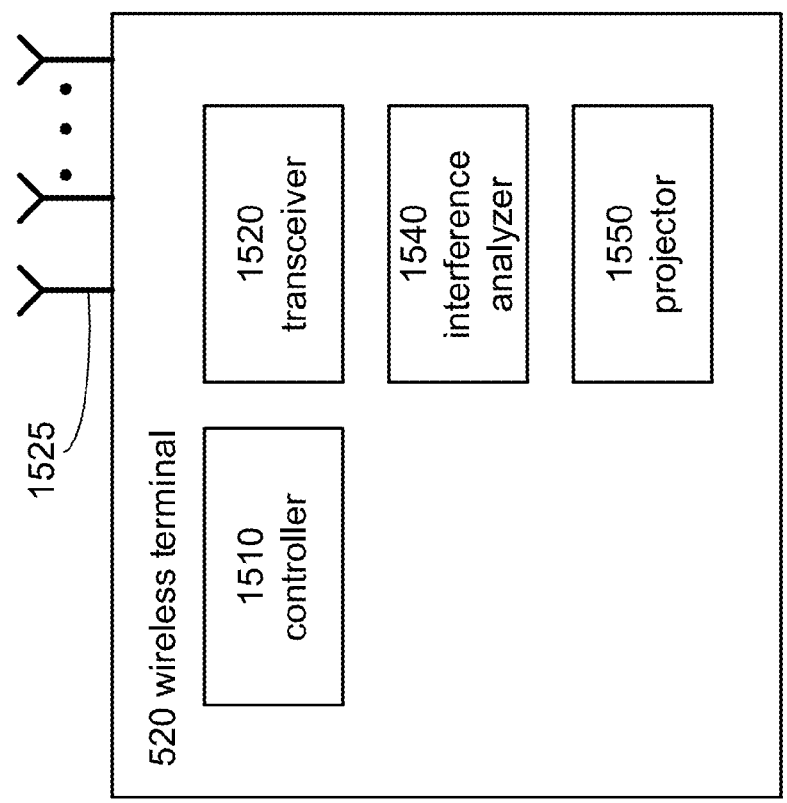

FIG. 15 illustrates an example embodiment of a wireless terminal 520. The wireless terminal 520 may comprise several devices including a controller 1510, a transceiver 1520, an interference analyzer 1540 and a projector 1550. The transceiver 1520 may be structured to wirelessly communicate with radio network nodes 510. The interference analyzer 1540 may be structured to analyze interferences including both internal and external interferences. The projector 1550 may be structured to project a signal of a signal space to a desired signal subspace. The controller 1510 may be structured to control the overall operations of the radio network node 510.

FIG. 15 provides a logical view of the wireless terminal 520. It is not strictly necessary that each device be implemented as physically separate modules or circuits. Some or all devices may be combined in a physical module. Also, one or more devices may be implemented in multiple physical modules.

Figure 16:
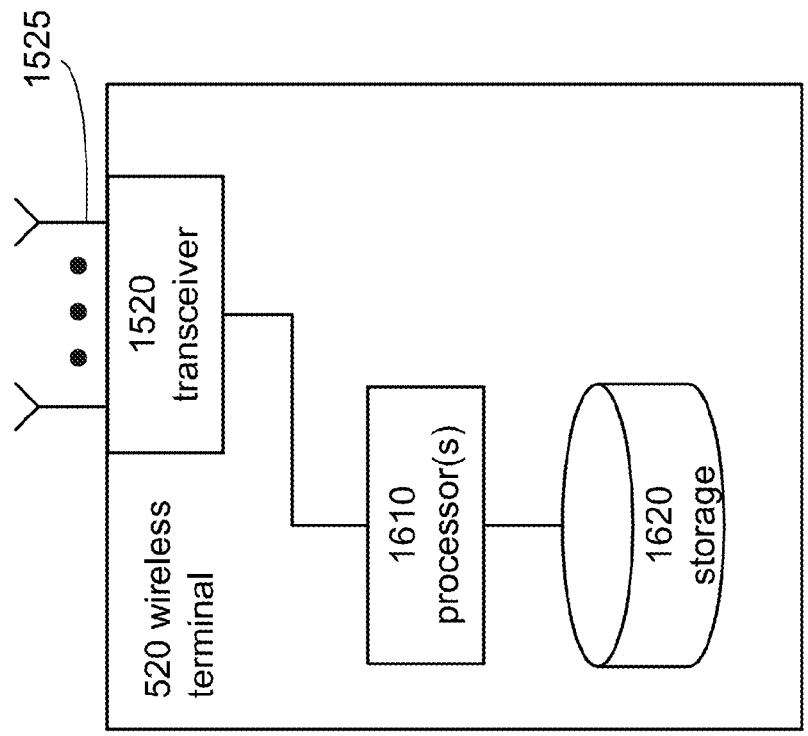
FIGS. 15 and 16 respectively illustrate example embodiments of a wireless terminal.

The devices of the wireless terminal 520 as illustrated in FIG. 15 need not be implemented strictly in hardware. It is envisioned that any of the devices maybe implemented through a combination of hardware and software. For example, as illustrated in FIG. 16, the wireless terminal 520 may include one or more central processing units 1610 executing program instructions stored in a storage 1620 such as non-transitory storage medium or firmware (e.g., ROM, RAM, Flash) to perform the functions of the devices. The program instructions may also be provided as a signal. The wireless terminal 520 may also include a transceiver 1520 structured to receive wireless signals from the radio network nodes 510 and to send signals to the radio network nodes 510 over one or more antennas 1525 in one or more channels.

In adaptive external interference cancellation, the receiver (e.g., the wireless terminal 520 in the downlink) also plays a significant role. While they are related, the transmit signal transmitted from the radio network node 510 and a received signal received at the wireless terminal 520 should be distinguished. Referring back to FIG. 5, the wireless terminal 520 receives the transmit signal S-1 transmitted from the paired radio network node 510. However, the wireless terminal 520 may also receive any one or more of the uncoordinated interfering signals E-4, E-5 and E-6 as well as the noise N. In the figure, it is assumed that the coordinated (internal) interferences I-2 and I-3 are address through known techniques and thus are not described in detail. In any case, the received signal received at the wireless terminal 520 should be considered to include, not only the transmit signal from the paired radio network node 510, but also to include transmit signals from the unpaired (unintended) radio network nodes 515, 517.

Presumably, the interfering signals E-4, E-5 and E-6 occupy the interference subspace of the wireless terminal 520. Then the external interference of the wireless terminal 520 may be canceled by projecting the received signal to the desired subspace, which by definition is orthogonal to the interference subspace.

Figure 17:
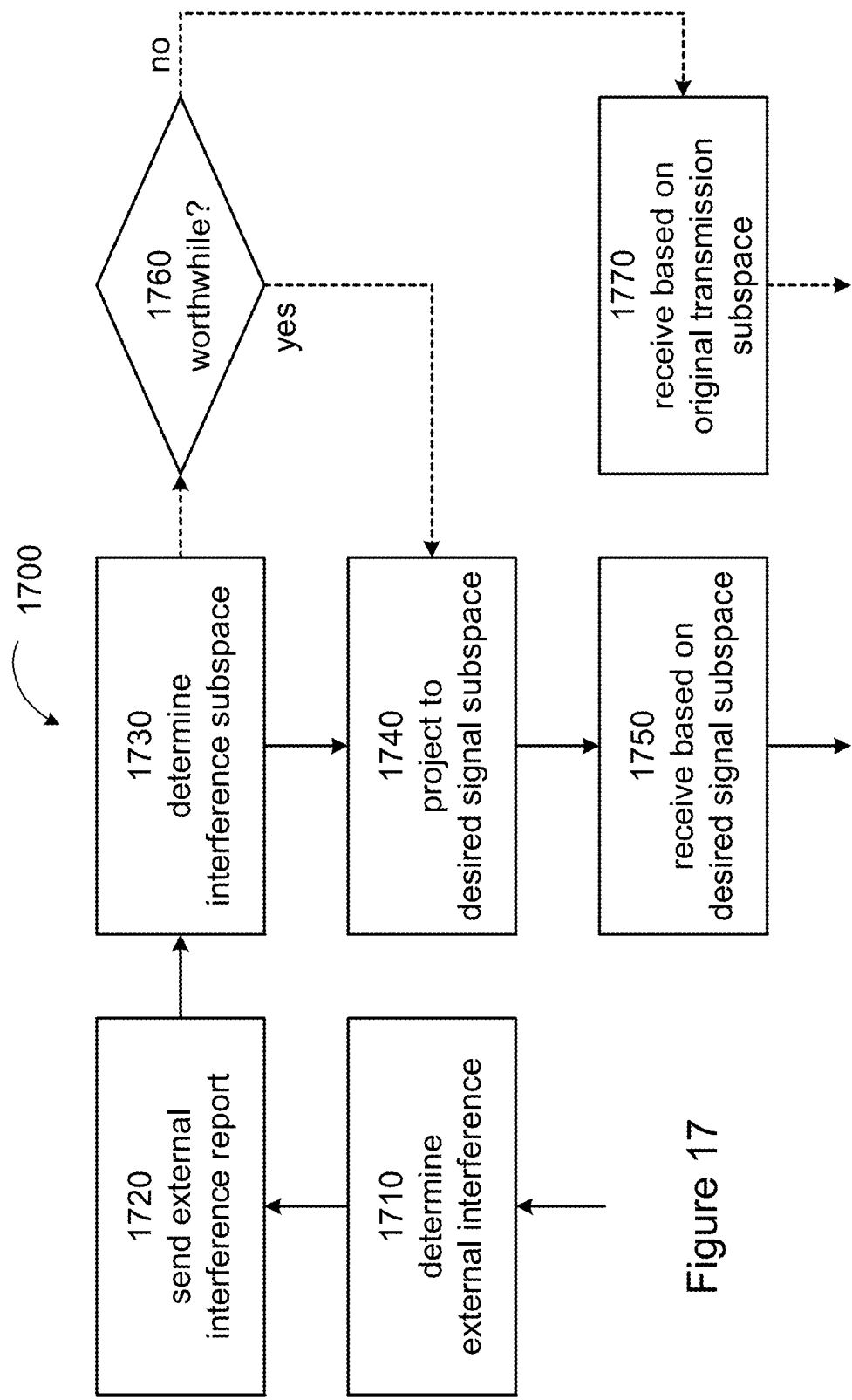
FIG. 17 illustrates a flow chart of an example method performed at a wireless terminal to adaptively cancel an external interference.

FIG. 17 illustrates a flow chart of an example method performed at the wireless terminal 520 to adaptively cancel the external interference. The method 1700 may be performed by any combination of devices of the wireless terminal 520. In step 1710, the interference analyzer 1540 may determine the external interference of the wireless terminal 520. In step 1720, the transceiver 1520 may send an external interference report corresponding to the external interference to the radio network node 510. The types of information that can be included in the interference report has been discussed above.

In step 1730, the interference analyzer 1540 may analyze the external interference to determine an interference subspace of the wireless terminal 520. The interference subspace determined in this step may be a signal subspace that contains all or substantially all of the external interference of the wireless terminal 520. Recall that determining the interference subspace may be viewed as determining the direction(s) of the external interference. The details will not be repeated for sake of brevity.

In step 1740, the projector 1550 may project a received signal of an original receive subspace entirely or substantially entirely onto the desired signal subspace of the wireless terminal 520 based on the interference subspace. As mentioned many times, the desired signal subspace is a signal subspace orthogonal to the interference subspace. In step 1750, the transceiver 1520 may receive the received signal based on the desired signal subspace. The original receive subspace may correspond to an original receive stream set comprising a plurality of original receive streams.

Figure 18:
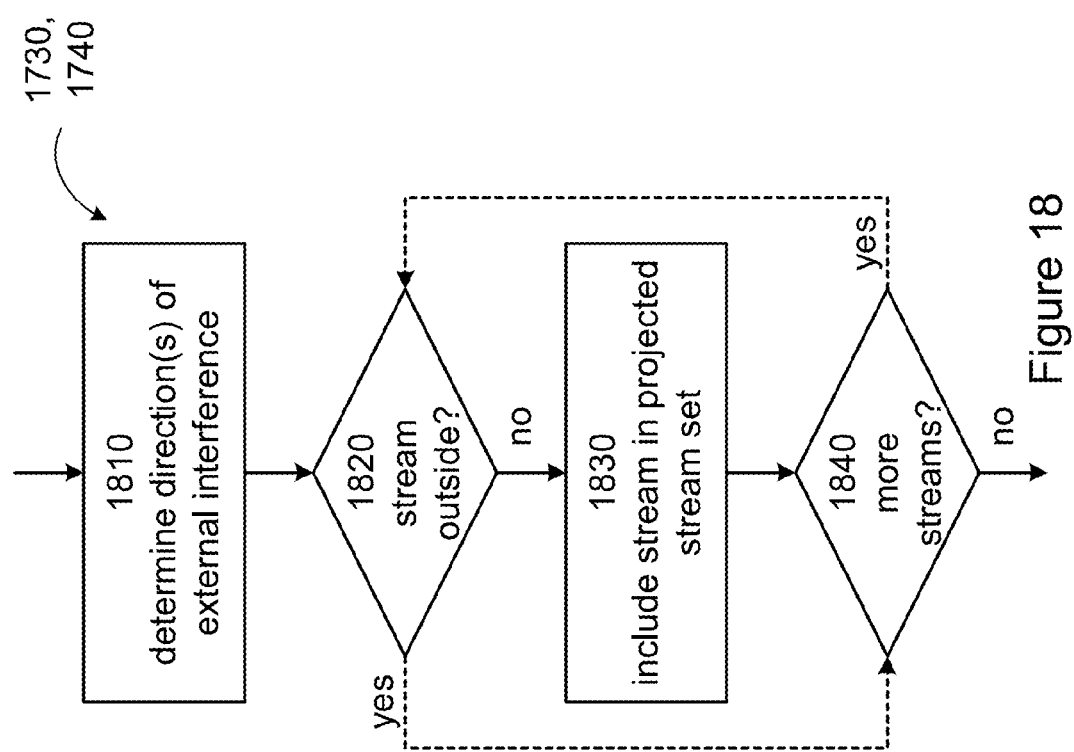
FIG. 18 illustrates a flow chart of an example process performed at a wireless terminal to determine an interference subspace and to project a received signal to a desired signal subspace.

FIG. 18 illustrates a flow chart of an example process to implement steps 1730 and 1740. As seen, in step 1810, the interference analyzer 1540 may determine the direction(s) of the external interference. For ease of reference, the original receive streams will be referred to as the original transmit stream set and the projected streams will be referred to as the projected stream set. The original receive stream set can correspond to the original receive subspace and the desired signal subspace can correspond to the projected stream set.

In step 1820, the interference analyzer 1540 may determine whether an original receive stream of the original receive stream set is substantially outside of the direction(s) of the external interference. If so, then in step 1830, the projector 1550 may include that original receive stream into the projected stream set. Then in step 1840, it is determined whether there are more original receive streams in the original transmit stream set. If so, the 1820, 1830, 1840 are repeated. In this way, the streams that are in the interference subspace are canceled. After the process completes, i.e., after the projection, the number of the projected streams in the projected stream set may be less than the number of the original received streams in the original received stream set.

Figure 19:
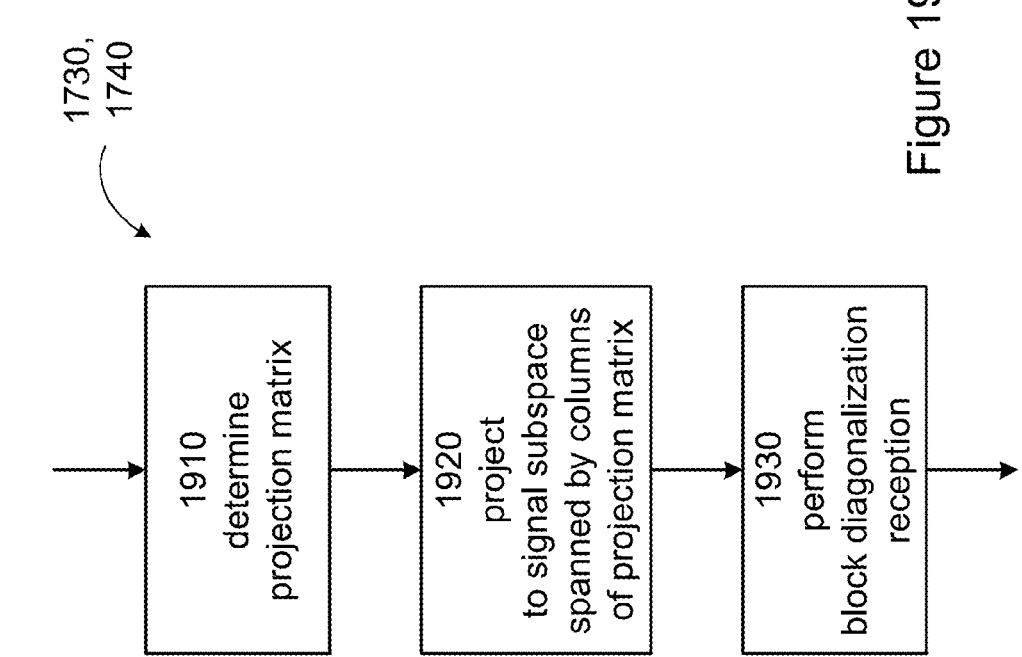
FIG. 19 illustrates a flow chart of another example process performed at a wireless terminal to determine an interference subspace and to project a received signal to a desired signal subspace.

FIG. 19 illustrates a flow chart of another example process to implement the steps 1730 and 1740. The process illustrated in this figure is an example where BD is employed. In this instance, it can be assumed that in the step 1710, an estimated covariance matrix $R_{ei}$ of the external interference is determined, and in the step 1720, the estimated covariance matrix $R_{ei}$ of the external interference is sent.

The projector 1550 may in steps 1910, 1920, and 1930, determine the projection matrix $P_i$ based on one or more right singular vectors of the estimated covariance matrix $R_{ei}$, project the received signal onto a signal subspace spanned by one or more columns of the projection matrix $P_i$ as the desired signal subspace, perform a block diagonalization reception of data. The projection matrix $P_i$ may be given by $N_i$ least significant right singular vectors of the external interference covariance matrix $R_{ei}$. The particulars of the interference covariance matrix $R_{ei}$ and the projection matrix $P_i$ have been discussed above with respect to the flow chart of FIG. 10.

In one aspect, in the step 1920, the received signal may be projected by left multiplying the received signal by $\overline{P}_i = P_i P_i^H$. In another aspect, in the step 1930, the original symbols may be recovered through applying a filter $W_i$ that diagonalizes an equivalent channel as seen by the wireless terminal 520. For example, the filter $W_i$ may be such that $W_i = (\overline{P}_i H_{i_{eq}})^\ominus$, where $(\cdot)^\ominus$ corresponds to the Moore-Penrose pseudo-inverse operation and $H_{i_{eq}} = H_i M_i P_i$.

Referring back to FIG. 17, once the interference subspace is determined in step 1730, the method 1700 may proceed directly to steps 1740 and 1750 to project the received signal to the desired signal subspace and to receive the signal based on the desired subspace.

But in an alternative aspect, the wireless terminal 520 may in step 1760 may determine whether the projection is worthwhile. The steps of FIG. 12 may also be performed by the wireless terminal 520 to make such determination. But in another aspect, the either the radio network node 510 or the wireless terminal 520 can make the determination and inform the other.

Figure 20:
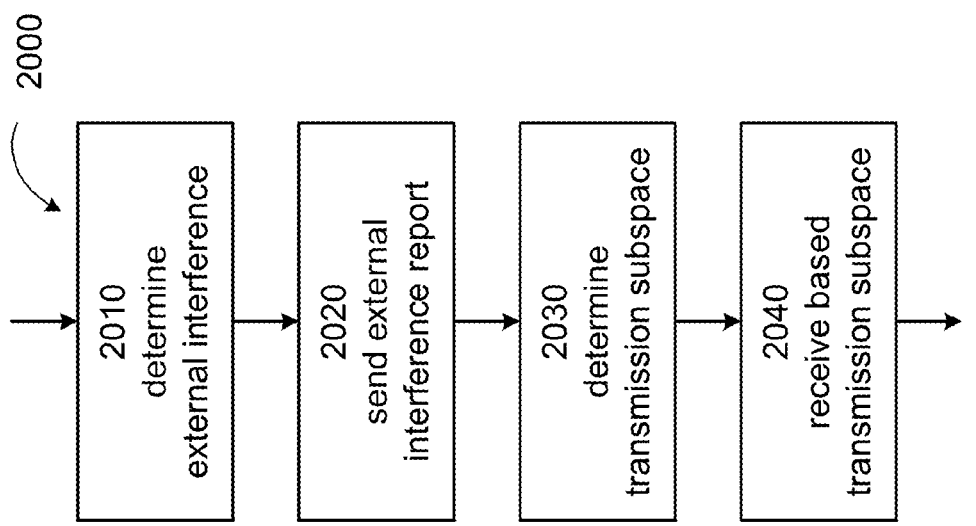
FIG. 20 illustrates a flow chart of another example method performed at a wireless terminal to adaptively cancel external interference.

FIG. 20 illustrates a flow chart of another example method performed at the wireless terminal 520 to adaptively cancel the external interference. The method 2000 may be performed by any combination of devices of the wireless terminal 520. In step 2010, the interference analyzer 1540 may determine the external interference of the wireless terminal 520. In step 2020, the transceiver 1520 may send an external interference report corresponding to the external interference to the radio network node 510. These steps can be similar to steps 1710 and 1720 of FIG. 17.

Figure 21:
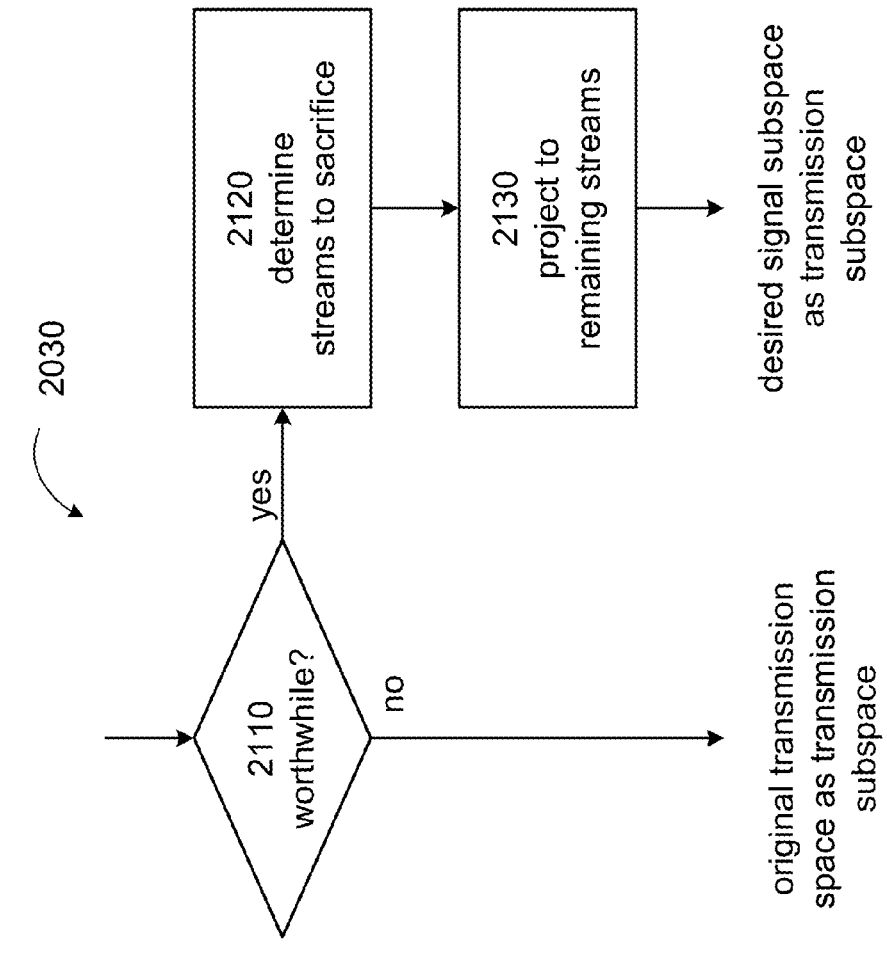
FIG. 21 illustrates a flow chart of an example process performed at a wireless terminal to determine a transmission subspace.

In step 2030, the wireless terminal 520 determine the transmission subspace. FIG. 21 illustrates and example process to implement the step 2030. As seen, the controller 1510 in step 2110 may determine whether the projection is worthwhile. This step may be similar to step 850.

If it is determined that the projection is worthwhile, then in step 2120, the interference analyzer 1540 may analyze the external interference report to determine the streams to sacrifice, and in step 2130, the projector 1550 may project the signal to the remaining projected streams. The steps of FIGS. 18 and 19 may also be performed to perform the steps 2120 and 2130. The result here can be that the desired signal subspace is the transmission subspace.

On the other hand, if it is determined that the projection is not worthwhile, then the original transmission subspace can be determined to be the transmission space. Referring back to FIG. 20, once the transmission subspace is determined, in step 2030, the transceiver 1520 may receive the signal transmitted from the radio network node 510 in step 2040. This step may be similar to step 1750 or 1770. Again, the number of streams to sacrifice is not necessarily fixed.

Simulations based on Monte-Carlo method were performed to ascertain the effectiveness of some of the disclosed techniques. In particular, average sum capacities achieved by some of the algorithms were obtained and the results are presented. In one simulation, a cluster of three cells with one user per cell was considered as illustrated in FIG. 2. This corresponds to a three user interference channel scenario. For each channel realization, the location of the users was randomly chosen. Each transmitter/receiver was simulated to be equipped with four antennas.

The transmission power in each radio network node was adapted to match an average value of SNR at a border of its respective cell. The external interference was modeled as a colored noise with one dominant direction and the average interference power was chosen as 20 dBm at the cluster border. These values were chosen to provide a scenario with noticeable external interference power, especially for the users closer to the cluster border. In this scenario, the following algorithms were evaluated:

Conventional BD—sending four data streams per user (marked with circles); and

Enhanced BD according to an aspect of the disclosed subject matter—suppressing one stream to mitigate the external interference (modeled with one dominant direction, marked with triangles).

Also evaluated are conventional IA algorithm—sending two streams per user (only two streams were sent due to limitation on degrees of freedom achievable, marked with squares), and an enhanced IA according to an aspect of the disclosed subject matter which attempts to mitigate the external interference (again, limited to two streams, marked with diamonds).

Figures 3, 4:
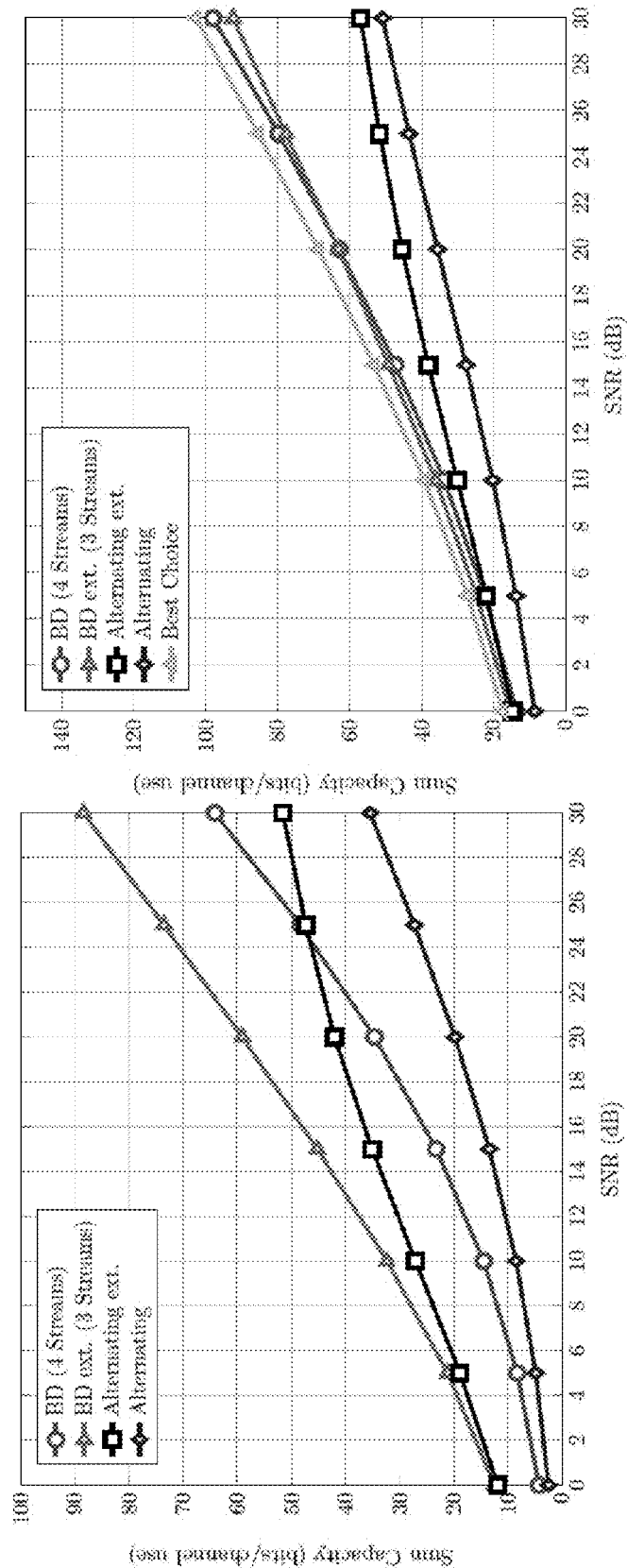
FIGS. 3 and 4 illustrate simulation results of applying some of the inventive techniques for adaptive cancellation of external interference.

Graphs of the results are presented in FIGS. 3 and 4. Note that the choice of the number of dimensions sacrificed for the external interference cancellation in the enhanced BD algorithm can be performed at a per user-basis, as described above. But the results presented in FIGS. 3 and 4 were restricted to a uniform selection for all users. What this means is that the gains from the proposed inventive techniques can be even greater than the results illustrated in these figures if the inventive techniques can be selectively applied to users.

In one simulation, the performances of the algorithms were evaluated in the presence of a strong external interference. In this simulation, the users were placed closer to cluster border, which is illustrated in FIG. 2 by the gray area. This corresponds to the users being located at a distance from the center of the cluster of at least ⅔ of the cluster radius. FIG. 3 shows the average sum capacity achieved by the algorithms in this scenario. The SNR values on the horizontal axis represent SNRs at the cell border. In the legend of the figure, the enhanced algorithms are referred to by an addition of "ext" after their names.

One observation to be drawn from FIG. 3 is the performance improvement of the inventive enhanced BD algorithm in comparison to the other algorithms, especially in comparison to the conventional BD algorithm. This is significant in that the enhanced BD algorithm outperforms the conventional BD algorithm despite transmitting less streams (three streams to four).

In another simulation, the users were placed anywhere in the cell randomly instead of just closer to the cluster border. FIG. 4 shows the average sum capacity achieved by the algorithms in this scenario. In FIG. 4, a curve representing the choice of the best algorithm at each iteration (channel realization), referred to as "Best Choice" is also shown.

Relative to the scenario of FIG. 3, it is seen that when the users are distributed throughout the cell, the enhanced algorithms provide lower gains. This is to be expected since the enhanced algorithms were primarily designed to better handle the external interference (as FIG. 3 verifies), which is stronger at the border of the cluster. Nonetheless, the enhanced algorithms still do provide gains.

Additionally, FIG. 4 provides an indication of the gains that an adaptable approach can provide, which can be even larger if a different choice per user is allowed. That is, better results can be achieved by selectively determining, for each user, whether or not the projection should be performed or not. Indeed, since users can be located anywhere in the cell, then it is more likely that one user sees strong external interference compared to the other two users. Hence, an adaptable approach is likely to increase more the system performance in this scenario.

A non-exhaustive list of advantages of one or more aspects of the described subject matter are as follows:

Can be employed to complement other methods used to cancel internal interference, such as IA or BD;

The only information required, in addition to the information already required for these algorithms, is an estimate of the external interference (e.g., external interference covariance matrix); and Can adapt the number of signal dimensions (e.g., streams) to cancel the external interference as necessary on a per-user basis.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed in a radio network node of a wireless network to adaptively cancel an external interference, the method comprising:
   receiving an external interference report from a wireless terminal of an external interference experienced by the wireless terminal, the wireless terminal being paired with the radio network node;
   determining an interference subspace of the wireless terminal based on the external interference report, the interference subspace being a signal subspace that contains the external interference of the wireless terminal;
   projecting a transmit signal of an original transmission subspace entirely onto a desired signal subspace of the wireless terminal based on the interference subspace, wherein the desired signal subspace is orthogonal to the interference subspace; and
   transmitting the transmit signal to the wireless terminal projected onto the desired signal subspace,
   wherein the original transmission subspace corresponds to an original transmit stream set comprising a plurality of original transmit streams,
   wherein the desired signal subspace corresponds to a projected stream set comprising one or more projected transmit streams, and
   wherein a number of the projected streams in the projected stream set is less than a number of the original transmit streams in the original transmit stream set.

2. The method of claim 1, wherein the step of determining the interference subspace and the step of projecting the transmit signal onto the desired subspace comprise:
   determining direction(s) of the external interference based on the external interference report;
   determining for each original transmit stream whether that original transmit stream is substantially outside of the direction(s) of the external interference; and
   including in the projected stream set only those original transmit streams determined to be substantially outside of the direction(s) of the external interference.

3. The method of claim 1, wherein the step of determining the interference subspace and the step of projecting the transmit signal onto the desired subspace comprise:
   estimating the external interference of the wireless terminal based on an estimated covariance matrix $R_{ei}$ of the external interference included in the external interference report;
   performing a block diagonalization process on the transmit signal so as to substantially eliminate multiuser interferences;
   determining a precoding matrix $M_i$ based on the block diagonalization process, a dimension of the precoding matrix $M_i$ corresponding to the number of the original transmit streams of the original transmit stream set;
   determining a projection matrix $P_i$ based on one or more right singular vectors of the estimated covariance matrix $R_{ei}$; and
   modifying the precoding matrix $M_i$ based on the projection matrix $P_I$ to arrive at a modified precoding matrix $\overline{M}_i$,
   wherein a dimension of the modified precoding matrix $\overline{M}_i$ is $N_i$ representing the number of the projected data streams.

4. The method of claim 3, wherein the projection matrix $P_i$ is given by $N_i$ least significant right singular vectors of the external interference covariance matrix $R_{ei}$.

5. The method of claim 3, wherein the step of transmitting the transmit signal to the wireless terminal projected onto the desired signal subspace comprises:
   precoding each projected stream of the projected stream set based on the modified precoding matrix $\overline{M}_i$; and
   transmitting the precoded projected streams to the wireless terminal.

6. The method of claim 1, further comprising:
   determining whether the projection is worthwhile based on one or more quality of service (QoS) parameters,
   wherein the step of transmitting the transmit signal to the wireless terminal projected onto the desired signal subspace is performed only when it is determined that the projection is worthwhile, and
   wherein the method further comprises transmitting (860) the transmit signal to the wireless terminal based on the original transmission subspace when it is determined that the projection is not worthwhile.

7. The method of claim 6, wherein the step of determining whether the projection is worthwhile comprises:
   determining an expected data rate with projection;
   determining an expected data rate without projection;
   determining whether the expected data rate with projection is greater than the expected data rate without projection by at least a threshold data rate margin;
   determining that the projection is worthwhile when it is determined that the expected data rate with the projection is greater than the expected data rate without the projection by at least the threshold data rate margin; and
   determining that the projection is not worthwhile when it is determined that the expected data rate with the projection is not greater than the expected data rate without the projection by at least the threshold data rate margin.

8. The method of claim 7,
   wherein each of the step of determining the expected data rate with the projection and the step of determining the expected data rate without the projection comprises determining $$R_i = \sum_{k=1}^{N_i} \log_2(1 + SINR_{ik}),$$

where $R_i$, represents the data rate, $N_i$ represents a dimension of a desired signal subspace of the user i, $SINR_{ik}$ represents a signal to interference plus noise ratio of a kth stream of user i given by $$SINR_{ik} = \left(\frac{I_{N_i}}{W_i W_i^* N_0 + W_i R_{ei} W_i^*}\right)_{k,k},$$

where $N_0$ represents a noise power spectral density, $W_i$, represents a reception filter for the user i, $I_{N_i}$ represents an identity matrix of dimension $N_i$, $R_{ei}$ represents a covariance matrix of the external interference, and $(A)_{k,k}$ represents a kth element in the diagonal of a matrix A,
   wherein in the step of determining the expected data rate with the projection, the reception filter $W_i=(\overline{P}_i H_i M_i P_i)^\theta$, where $P_i$ represents a projection matrix, $M_i$ represents a precoding matrix, $H_i$ represents a channel between all transmitters and the user i, $\overline{P}=P_i P_i^H$, and $(.)^\theta$ corresponds to a Moore-Penrose pseudo-inversion operation, and
   wherein in the step of determining the expected data rate without the projection, the reception filter $W_i=(H_i M_i)^\theta$.

9. A method performed in a wireless terminal to adaptively cancel an external interference, the method comprising:

determining an external interference experienced by the wireless terminal;

sending an external interference report corresponding to the external interference to a radio network node paired with the wireless terminal;

determining an interference subspace of the wireless terminal based on the external interference, the interference subspace being a signal subspace that contains substantially all of the external interference of the wireless terminal;

projecting a received signal of an original receive subspace substantially entirely onto a desired signal subspace of the wireless terminal based on the interference subspace, the desired signal subspace being orthogonal to the interference subspace; and receiving the received signal projected onto the desired signal subspace, wherein the original receive subspace corresponds to an original receive stream set comprising a plurality of original receive streams, wherein the desired signal subspace corresponds to a projected stream set comprising one or more projected transmit streams, and wherein a number of the projected streams in the projected stream set is less than a number of the original receive streams in the original receive stream set.

10. The method of claim 9, wherein the step of determining the interference subspace and the step of projecting the received signal onto the desired subspace comprise:

determining direction(s) of the external interference;

determining for each original received stream whether that original received stream is substantially outside of the direction(s) of the external interference; and including in the projected stream set only those original received streams determined to be substantially outside of the direction(s) of the external interference.

11. The method of claim 9, wherein in the step of determining the external interference, an estimated covariance matrix $R_{ei}$ of the external interference is determined, and wherein in the step of sending the external interference report, the estimated covariance matrix $R_{ei}$ of the external interference is sent.

12. The method of claim 11, wherein the step of determining the interference subspace and the step of projecting the received signal onto the desired subspace comprise:

determining a projection matrix $P_i$ based on one or more right singular vectors of the estimated covariance matrix $R_{ei}$;

projecting the received signal onto a signal subspace spanned by one or more columns of the projection matrix $P_i$ as the desired signal subspace; and performing a block diagonalization reception of data.

13. The method of claim 12, wherein the projection matrix $P_i$ is given by $N_i$ least significant right singular vectors of the external interference covariance matrix $R_{ei}$.

14. The method of claim 12, wherein in the step of projecting the received signal onto the signal subspace spanned by one or more columns of the projection matrix $P_i$, the received signal is left multiplied by $\overline{P}_i = P_i P_i^H$, and wherein in the step of performing the block diagonalization reception of the data, original symbols are recovered through applying a filter $W_i$ that diagonalizes an equivalent channel as seen by the wireless terminal.

15. The method of claim 9, further comprising determining whether the projection is worthwhile based on one or more quality of service (QoS) parameters.

16. The method of claim 15, wherein the step of determining whether the projection is worthwhile comprises:

determining an expected data rate with projection;

determining an expected data rate without projection;

determining whether the expected data rate with projection is greater than the expected data rate without projection by at least a threshold data rate margin;

determining that the projection is worthwhile when it is determined that the expected data rate with the projection is greater than the expected data rate without the projection by at least the threshold data rate margin; and determining that the projection is not worthwhile when it is determined that the expected data rate with the projection is not greater than the expected data rate without the projection by at least the threshold data rate margin.

17. The method of claim 16, wherein each of the step of determining the expected data rate with the projection and the step of determining the expected data rate without the projection comprises determining $$R_i = \sum_{k=1}^{N_i} \log_2(1 + SINR_{ik}),$$

where $R_i$ represents the data rate, $N_i$ represents a dimension of a desired signal subspace of the user i, $SINR_{ik}$ represents a signal to interference plus noise ratio of a kth stream of user i given by $$SINR_{ik} = \left( \frac{I_{N_i}}{W_i W_i^* N_0 + W_i R_{ei} W_i^*} \right)_{k,k},$$

where $N_0$ represents a noise power spectral density, $W_i$ represents a reception filter for the user i, $I_{N_i}$ represents an identity matrix of dimension $N_i$, $R_{ei}$ represents a covariance matrix of the external interference, and $(A)_{k,k}$ represents a kth element in the diagonal of a matrix A, wherein in the step of determining the expected data rate with the projection, the reception filter $W_i = (\overline{P}_i H_i M_i P_i)^{\Theta}$, where $P_i$ represents a projection matrix, $M_i$ represents a precoding matrix, $H_i$ represents a channel between all transmitters and the user i, $\overline{P}_i = P_i P_i^H$, and $(.)^{\Theta}$ corresponds to a Moore-Penrose pseudo-inversion operation, and wherein in the step of determining the expected data rate without the projection, the reception filter $W_i = (H_i M_i)^{\Theta}$.

18. A radio network node of a wireless network configured to adaptively cancel an external interference, the radio network node comprising:

a first controller configured to receive an external interference report from a wireless terminal of an external interference experienced by the wireless terminal, the wireless terminal being paired with the radio network node, and determine an interference subspace of the wireless terminal based on the external interference report, the interference subspace being a signal subspace that contains the external interference of the wireless terminal;

a second controller configured to project a transmit signal of an original transmission subspace entirely onto a desired signal subspace of the wireless terminal based on the interference subspace, the desired signal subspace being orthogonal to the interference subspace; and
a transceiver configured to transmit the transmit signal to the wireless terminal projected onto the desired signal subspace,
wherein the original transmission subspace corresponds to an original transmit stream set comprising a plurality of original transmit streams,
wherein the desired signal subspace corresponds to a projected stream set comprising one or more projected transmit streams, and
wherein a number of the projected streams in the projected stream set is less than a number of the original transmit streams in the original transmit stream set.

19. The radio network node of claim 18,
wherein the first controller is further configured to
determine direction(s) of the external interference based on the external interference report, and
determine for each original transmit stream whether that original transmit stream is substantially outside of the direction(s) of the external interference, and
wherein the second controller is configured to include in the projected stream set only those original transmit streams determined to be substantially outside of the direction(s) of the external interference.

20. The radio network node of claim 18,
wherein the first controller is further configured to estimate the external interference of the wireless terminal based on an estimated covariance matrix $R_{ei}$, of the external interference included in the external interference report,
wherein the second controller is configured to
perform a block diagonalization process on the transmit signal so as to substantially eliminate multiuser interferences,
determine a precoding matrix $M_i$ based on the block diagonalization process, a dimension of the precoding matrix $M_i$ corresponding to the number of the original transmit streams of the original transmit stream set,
determine a projection matrix $P_i$ based on one or more right singular vectors of the estimated covariance matrix $R_{ei}$, and
modify the precoding matrix $M_i$ based on the projection matrix $P_i$ to arrive at a modified precoding matrix $\overline{M}_i$,
wherein a dimension of the modified precoding matrix $\overline{M}_i$ is $N_i$ representing the number of the projected data streams, and
wherein the projection matrix $P_i$ is given by $N_i$ least significant right singular vectors of the external interference covariance matrix $R_{ei}$.

21. The radio network node of claim 20,
wherein the second controller is configured to precode each projected stream of the projected stream set based on the modified precoding matrix $\overline{M}_i$, and
wherein the radio network node further comprises a transceiver configured to transmit the precoded projected streams to the wireless terminal.

22. The radio network node of claim 18, further comprising a third controller configured to determine whether the projection is worthwhile based on one or more quality of service (QoS) parameters, wherein the third controller is configured to
determine an expected data rate with projection,
determine an expected data rate without projection,
determine whether the expected data rate with projection is greater than the expected data rate without projection by at least a threshold data rate margin,
determine that the projection is worthwhile when it is determined that the expected data rate with the projection is greater than the expected data rate without the projection by at least the threshold data rate margin, and
determine that the projection is not worthwhile when it is determined that the expected data rate with the projection is not greater than the expected data rate without the projection by at least the threshold data rate margin.

23. The radio network node of claim 22, wherein the third controller is configured to
when determining the expected data rate with and without the projection, determine $$R_i = \sum_{k=1}^{N_i} \log_2(1 + SINR_{ik}),$$

where $R_i$ represents the data rate, $N_i$ represents a dimension of a desired signal subspace of the user i, $SINR_{ik}$ represents a signal to interference plus noise ratio of a kth stream of user i given by $$SINR_{ik} = \left( \frac{I_{N_i}}{W_i W_i^* N_0 + W_i R_{ei} W_i^*} \right)_{k,k},$$

where $N_0$ represents a noise power spectral density, $W_i$ represents a reception filter for the user i, $I_{N_i}$ represents an identity matrix of dimension $N_i$, $R_{ei}$ represents a covariance matrix of the external interference, and $(A)_{k,k}$ represents a kth element in the diagonal of a matrix A,
use as the reception filter $W_i = (\overline{P}_i H_i M_i P_i)^{\theta}$ when determining the expected data rate with projection, where $P_i$ represents a projection matrix, $M_i$ represents a precoding matrix, $H_i$ represents a channel between all transmitters and the user i, $\overline{P}_i = P_i P_i^H$, and $(.)^{\theta}$ corresponds to a Moore-Penrose pseudo-inversion operation, and
use as the reception filter $W_i = (H_i M_i)$ when determining the expected data rate without the projection.

24. A wireless terminal configured to adaptively cancel an external interference, the wireless terminal comprising:
a first controller configured to
determine an external interference experienced by the wireless terminal, and
an interference subspace of the wireless terminal based on the external interference, the interference subspace being a signal subspace that contains substantially all of the external interference of the wireless terminal,
a transceiver configured to send an external interference report corresponding to the external interference to a radio network node paired with the wireless terminal,
a second controller configured to project a received signal of an original receive subspace substantially entirely onto a desired signal subspace of the wireless terminal based on the interference subspace, the desired signal subspace being orthogonal to the interference subspace, and
a transceiver configured to receive the received signal projected onto the desired signal subspace,
wherein the original receive subspace corresponds to an original receive stream set comprising a plurality of original receive streams, wherein the desired signal subspace corresponds to a projected stream set comprising one or more projected transmit streams, and
wherein a number of the projected streams in the projected stream set is less than a number of the original receive streams in the original receive stream set.

25. The wireless terminal of claim 24, wherein the step of determining the interference subspace and the step of projecting the received signal onto the desired subspace comprise:
wherein the first controller is further configured to
determine direction(s) of the external interference, and
determine for each original received stream whether that original received stream is substantially outside of the direction(s) of the external interference, and
wherein the second controller is configured to include in the projected stream set only those original received streams determined to be substantially outside of the direction(s) of the external interference.

26. The wireless terminal of claim 24,
wherein the first controller is further configured to determine an estimated covariance matrix $R_{ei}$ of the external interference,
wherein the second controller is configured to
determine a projection matrix $P_i$ based on one or more right singular vectors of the estimated covariance matrix $R_{ei}$,
project the received signal onto a signal subspace spanned by one or more columns of the projection matrix $P_i$ as the desired signal subspace through left multiplying the received signal by $\overline{P}_i = P_i P_i^H$, and
perform a block diagonalization reception of data through applying a filter $W_i$ that diagonalizes an equivalent channel as seen by the wireless terminal,
wherein the projection matrix $P_i$ is given by $N_i$ least significant right singular vectors of the external interference covariance matrix $R_{ei}$.

27. The wireless terminal of claim 24, further comprising a third controller configured to determine whether the projection is worthwhile based on one or more quality of service (QoS) parameters, wherein the third controller is configured to
determine an expected data rate with projection,
determine an expected data rate without projection,
determine whether the expected data rate with projection is greater than the expected data rate without projection by at least a threshold data rate margin,
determine that the projection is worthwhile when it is determined that the expected data rate with the projection is greater than the expected data rate without the projection by at least the threshold data rate margin, and
determine that the projection is not worthwhile when it is determined that the expected data rate with the projection is not greater than the expected data rate without the projection by at least the threshold data rate margin.

28. The wireless terminal of claim 27, wherein the third controller is configured to
when determining the expected data rate with and without the projection, determine $$R_i = \sum_{k=1}^{N_i} \log_2(1 + SINR_{ik}),$$

where $R_i$ represents the data rate, $N_i$ represents a dimension of a desired signal subspace of the user i, $SINR_{ik}$ represents a signal to interference plus noise ratio of a kth stream of user i given by $$SINR_{ik} = \left( \frac{I_{N_i}}{W_i W_i^* N_0 + W_i R_{ei} W_i^*} \right)_{k,k},$$

where $N_0$ represents a noise power spectral density, $W_i$ represents a reception filter for the user i, $I_{N_i}$ represents an identity matrix of dimension $N_i$, $R_{ei}$ represents a covariance matrix of the external interference, and $(A)_{k,k}$ represents a kth element in the diagonal of a matrix A,
use as the reception filter $W_i = (\overline{P}_i H_i M_i P_i)^\theta$ when determining the expected data rate with projection, where $P_i$ represents a projection matrix, $M_i$ represents a precoding matrix, $H_i$ represents a channel between all transmitters and the user i, $\overline{P}_i = P_i P_i^H$, and $(.)^\theta$ corresponds to a Moore-Penrose pseudo-inversion operation, and
use as the reception filter $W_i = (H_i M_i)^\theta$ when determining the expected data rate without the projection.

* * * * *